(12) United States Patent
Edwards et al.

(10) Patent No.: US 7,455,889 B2
(45) Date of Patent: Nov. 25, 2008

(54) HOLOGRAPHIC MEDIA FABRICATION TECHNIQUES

(75) Inventors: Jathan D. Edwards, Afton, MN (US); Ramon F. Hegel, North St. Paul, MN (US); Thomas J. Adam, Cottage Grove, MN (US)

(73) Assignee: Imation Corp., Oakdale, MN (US)

( * ) Notice: Subject to any disclaimer, the term of this patent is extended or adjusted under 35 U.S.C. 154(b) by 717 days.

(21) Appl. No.: 10/807,821

(22) Filed: Mar. 24, 2004

(65) Prior Publication Data

US 2005/0214682 A1    Sep. 29, 2005

(51) Int. Cl.
*C08F 2/46* (2006.01)
*C08J 7/18* (2006.01)
*B05D 5/06* (2006.01)
*B05D 3/06* (2006.01)
*B29D 11/00* (2006.01)
*B01F 5/00* (2006.01)

(52) U.S. Cl. .................. 427/508; 427/512; 427/516; 427/162; 427/164; 264/1.36; 264/1.7; 264/1.9; 264/2.5; 366/69; 366/341; 366/336

(58) Field of Classification Search .................. None
See application file for complete search history.

(56) References Cited

U.S. PATENT DOCUMENTS

| | | | |
|---|---|---|---|
| 3,794,300 A * | 2/1974 | Harder | 366/339 |
| 3,842,197 A | 10/1974 | Broussaud et al. | |
| 3,998,260 A * | 12/1976 | Kopp et al. | 164/21 |
| 4,053,141 A * | 10/1977 | Gussefeld | 366/339 |
| 4,330,604 A | 5/1982 | Wreede et al. | |
| 4,948,968 A | 8/1990 | Matsui | |
| 4,992,336 A | 2/1991 | Yamamoto et al. | |
| 5,137,369 A * | 8/1992 | Hodan | 366/340 |
| 5,233,597 A | 8/1993 | Nakayama et al. | |
| 5,279,689 A | 1/1994 | Shvartsman | |

(Continued)

FOREIGN PATENT DOCUMENTS

DE    4208328    9/1993

(Continued)

OTHER PUBLICATIONS

Akedo et al., "High-precision detection method for the reference position in an optical encoder," Applied Optics, vol. 32, No. 13, May 1, 1993, pp. 2315-2319.-

(Continued)

*Primary Examiner*—Marianne L Padgett
(74) *Attorney, Agent, or Firm*—Eric D. Levinson

(57) ABSTRACT

Holographic data storage media having a sandwiched construction are described in which a holographic recording material is sandwiched between two substrates. The holographic media formulation is often formed of two or more components mixed to obtain a homogeneous formulation. The holographic media formulation may include two or more components which are mixed together prior to injection between the substrates. Curing of the holographic media formulation is substantially avoided during mixing, yet accelerated after the formulation is injected between the substrates. Accordingly, the system and techniques can be used to improve the large scale manufacturability of such media by allowing for fabrication of such media within reasonable cycle times, such as less than one minute, while adhering to stringent requirements for optical clarity and parallelism.

10 Claims, 15 Drawing Sheets

U.S. PATENT DOCUMENTS

| | | | |
|---|---|---|---|
| 5,326,240 | A | 7/1994 | Kudo et al. |
| 5,458,985 | A | 10/1995 | Isono et al. |
| 5,460,763 | A | 10/1995 | Asai |
| 5,470,627 | A | 11/1995 | Lee et al. |
| 5,476,700 | A | 12/1995 | Asai et al. |
| 5,486,049 | A * | 1/1996 | Boatman et al. ......... 366/175.2 |
| 5,487,926 | A | 1/1996 | Kuribayashi et al. |
| 5,582,891 | A | 12/1996 | Murakami et al. |
| 5,597,613 | A | 1/1997 | Galarneau et al. |
| 5,673,251 | A | 9/1997 | Suzuki et al. |
| 5,675,570 | A | 10/1997 | Ohira et al. |
| 5,719,691 | A | 2/1998 | Curtis et al. |
| 5,777,760 | A | 7/1998 | Hays et al. |
| 5,812,288 | A | 9/1998 | Curtis et al. |
| 5,827,593 | A | 10/1998 | Maruyama et al. |
| 5,838,650 | A | 11/1998 | Campbell et al. |
| 5,865,537 | A * | 2/1999 | Streiff et al. ............. 366/174.1 |
| 5,874,187 | A | 2/1999 | Colvin et al. |
| 5,876,823 | A | 3/1999 | Nagashima |
| 5,893,998 | A | 4/1999 | Kelley et al. |
| 5,917,798 | A | 6/1999 | Horimai et al. |
| 5,932,042 | A | 8/1999 | Gensel et al. |
| 5,938,328 | A * | 8/1999 | Pinto et al. ............... 366/174.1 |
| 5,978,112 | A | 11/1999 | Psaltis et al. |
| 6,027,241 | A * | 2/2000 | King ....................... 366/181.5 |
| 6,042,684 | A | 3/2000 | Ohman |
| 6,108,297 | A | 8/2000 | Ohta et al. |
| 6,111,828 | A | 8/2000 | McLeod et al. |
| 6,132,545 | A | 10/2000 | Motokawa et al. |
| 6,322,933 | B1 | 11/2001 | Daiber et al. |
| 6,348,983 | B1 | 2/2002 | Curtis et al. |
| 6,425,968 | B1 | 7/2002 | Eichlseder |
| 6,538,776 | B2 | 3/2003 | Edwards |
| 6,543,241 | B2 | 4/2003 | Levitin et al. |
| 6,611,365 | B2 | 8/2003 | Edwards et al. |
| 6,625,100 | B2 | 9/2003 | Edwards |
| 6,650,447 | B2 | 11/2003 | Curtis et al. |
| 6,695,213 | B2 | 2/2004 | Curtis |
| 6,743,552 | B2 | 6/2004 | Setthachayanon et al. |
| 6,765,061 | B2 | 7/2004 | Dhar et al. |
| 6,804,034 | B2 * | 10/2004 | Edwards ........................ 359/3 |
| 7,034,971 | B2 * | 4/2006 | Edwards et al. ................ 359/3 |
| 7,287,899 | B2 * | 10/2007 | Navarro et al. ............. 366/341 |
| 7,320,541 | B2 * | 1/2008 | Wagner et al. ........... 366/172.1 |
| 7,357,564 | B2 * | 4/2008 | Reis et al. ................. 366/160.4 |
| 7,390,121 | B2 * | 6/2008 | Jahn et al. ................... 366/337 |
| 2002/0114027 | A1 | 8/2002 | Horimai |
| 2002/0197440 | A1 | 12/2002 | Waldman et al. |
| 2003/0044576 | A1 | 3/2003 | Dhar et al. |
| 2003/0044577 | A1 | 3/2003 | Dhar et al. |
| 2003/0224250 | A1 | 12/2003 | Setthachayanon et al. |
| 2004/0036931 | A1 | 2/2004 | Edwards |
| 2008/0029914 | A1* | 2/2008 | Hamanaka .................. 264/1.1 |

FOREIGN PATENT DOCUMENTS

| | | |
|---|---|---|
| EP | 0 386 971 A1 | 9/1999 |
| JP | 61126648 | 6/1986 |
| JP | 63-74618 | 4/1988 |
| JP | 63124247 | 5/1988 |
| JP | 2-134219 | 5/1990 |
| JP | 05278088 | 10/1993 |
| JP | 9-295319 | 11/1997 |
| JP | 10-230524 | 9/1998 |
| WO | WO 98/47143 | 10/1998 |
| WO | WO 00/48172 A2 | 8/2000 |
| WO | WO 01/57602 A1 | 8/2001 |
| WO | WO 03/102959 A1 | 12/2003 |

OTHER PUBLICATIONS

Psaltis et al., "Holographic storage using shift multiplexing," Optics Letters, vol. 20, No. 7, Apr. 1, 1995, pp. 782-784.

Pu et al., "High-density recording in photopolymer-based holographic three-dimensional disks," Applied Optics, vol. 35, No. 14, May 1996, pp. 2389-2398.

Barbastathis et al., "Shift multiplexing with spherical reference waves," Applied Optics, vol. 35, No. 14, May 1996, pp. 2403-2417.

Psaltis et al., "Holographic Data Storage," Computer IEEE, Feb. 1998, pp. 52-60.

Dhar et al., "Holographic storage of multiple high-capacity digital data pages in thick photopolymer system," Optics Letters, vol. 23, No. 21, Nov. 1, 1988, pp. 1710-1712.

Curtis et al., "High Density, High Performance Data Storage via Volume Holography: The Lucent Technologies Hardware Platform," Bell Laboratories, Lucent Technologies, pp. 1-9, published in 2000 by Holographic Data Storage, Ed. Coufal et al, no month.

Ashley et al, "Holographic data storage," IBM J. Res Develop, vol. 44, No. 3, May 3, 2000, pp. 341-368.

* cited by examiner

HOLOGRAPHIC MEDIA FABRICATION TECHNIQUES

FIELD

The invention relates to holographic data storage media and, more particularly, devices and manufacturing processes for use in the fabrication of holographic data storage media.

BACKGROUND

Many different types of data storage media have been developed to store information. Traditional media, for instance, include magnetic media, optical media, and mechanical media to name a few. Increasing data storage density is a paramount goal in the development of new or improved types of data storage media.

In traditional media, individual bits of information are stored as distinct mechanical, optical, or magnetic changes on the surface of the media. For this reason, data storage medium surface area imposes physical limits on data densities for a given recording technique.

Holographic data storage media can offer higher storage densities than traditional media. In a holographic medium, data can be stored throughout the volume of the medium rather than the medium surface. In other words, holographic media permit three-dimensional data storage. Theoretical holographic storage densities can approach tens of terabits per cubic centimeter.

In holographic data storage media, entire pages of information, e.g., bitmaps, can be stored as optical interference patterns within a photosensitive recording material. This is done by intersecting two coherent laser beams within the recording material. The first laser beam, called the object beam, contains the information to be stored; and the second, called the reference beam, interferes with the object beam to create an interference pattern that is stored in the recording material as a hologram. When the stored hologram is later illuminated with only the reference beam, some of the light of the reference beam is diffracted by the holographic interference pattern. Moreover, the diffracted light creates a reconstruction of the original object beam. Thus, by illuminating a recorded hologram with the reference beam, the data encoded in the object beam can be recreated and detected by a data detector such as a camera.

Holographic data storage media typically have a sandwiched construction in which a holographic media formulation is sandwiched between two substrates. The holograms are recorded and stored in the holographic media formulation. The holographic media formulation is often formed of two or more components. For example, a first component may include a photoinitiator and a second component may include a write monomer. Additives or other components may also be included in the formulation.

SUMMARY

The invention is directed to holographic data storage media fabrication techniques. In particular, systems and methods for use in the fabrication of holographic data storage media are described. Holographic media typically have a sandwich construction in which a holographic media formulation is sandwiched between two substrates. The holographic media formulation may include two or more components which are mixed together prior to injection between the substrates. The system and methods described herein allow for fabrication of such media within reasonable cycle times, such as less than one minute, and may adhere to stringent requirements for optical clarity and parallelism to ensure optimal performance of the media.

Fabrication of a holographic data storage media includes mixing the components of the holographic media formulation and dispensing the holographic media formulation between two substrates. In order to meet certain requirements for optical clarity, the components may be mixed to produce a homogeneous holographic media formulation and dispensed such that no flow lines are produced in the media. Moreover, in order to ensure that the holographic data storage media meet the parallelism requirements, the two substrates may be aligned to within one optical fringe. The invention may include a cavity to align the two substrates, and the cavity may be pre-aligned or dynamically adjusted in order to meet these parallelism requirements.

Depending on the material used for the holographic media formulation, the time it takes the holographic media formulation to cure can vary significantly. In any case, the invention may use heat or radiation to increase the rate at which the holographic media formulation cures once the formulation is injected between the substrates. For instance, heat may be applied to the holographic data storage media while the media is in the cavity, after the holographic media formulation has been dispensed and the two substrates optically aligned. The applied heat increases the cure rate of the holographic media formulation allowing the media to be removed more quickly from the cavity without substantially affecting the optical clarity or parallelism. Alternatively or additionally, radiation may be applied to increase the cure rate, such as RF radiation, microwave radiation and/or ultraviolet radiation. Longwave radiation may also be used to accelerate the cure rate, wherein longwave radiation refers to radiation having a larger wavelength than the sensitivity of the write monomer in the holographic formulation. The use of longwave radiation to accelerate the cure may be particularly effective with the addition of a photosensitive dye to the formulation.

In various phases of the fabrication process, it is desirable to adjust the cure rate. Curing of the holographic media formulation should be avoided during the mixing process, yet accelerated after the formulation is dispensed between the two substrates. For example, if the formulation cures while still being mixed, prior to being dispensed, a dynamic material viscosity may be created through the mixer, which is undesirable. In particular, dynamic material viscosity through the mixer may cause induced striations in the holographic media formulation or undesirable back-pressure during dispensing. Further, any curing during the mixing phase is generally undesirable.

The invention mixes the multiple components of the formulation in stages in order to ensure a homogeneous mixture. Moreover, in order to accelerate cure rate, heat or radiation may be applied after the formulation is dispensed between the two substrates. The perimeter of the holographic media may further be cured to seal the media from environmental degradation. Additionally, an optical cure may be used to secure hubs to the media. Performing accelerated curing techniques only after the formulation has been dispensed helps avoid any unwanted curing during the mixing phase while still improving cycle times.

In one embodiment, the invention is directed to a system to fabricate holographic data storage media. The system may include a first reservoir to hold a first component of a multi-chemistry holographic formulation and a second reservoir to hold a second component of the multi-chemistry holographic formulation. The system may also include a mixer to receive the first and second components and mix the first and second components to create the multi-chemistry holographic formulation. The mixer includes a first stage including a first set of mixing elements and a second stage including a second set of mixing elements, wherein the mixing elements in the first stage are larger than the mixing elements in the second stage. Additional stages with progressively smaller mixing elements may also be used, e.g., a third stage with mixing elements smaller than the second stage, a fourth stage with mixing elements smaller than the second stage, and so forth. The mixing elements of the various stages may comprise static mixing elements. The mixer may also include a dispense nozzle to dispense the multi-chemistry holographic formulation from the mixer between the two substrates once a homogeneous mixture is obtained.

In another embodiment, the invention may comprise a method to fabricate a holographic data storage medium. The method may include mixing at least a first and a second component to create a multi-chemistry holographic formulation using a mixer comprising a first stage including a first set of mixing elements and a second stage including a second set of mixing elements. The mixing elements in the first stage are larger than the mixing elements in the second stage. Additional stages with progressively smaller mixing elements may also be used, e.g., a third stage with mixing elements smaller than the second stage, a fourth stage with mixing elements smaller than the third stage, and so forth. The mixing elements of the various stages may comprise static mixing elements. The method may also include dispensing the multi-chemistry holographic formulation between two substrates.

The techniques and system described herein can achieve various advantages. In particular, the system and techniques allow for creation of a homogeneous holographic media formulation from multiple components. Also, cure rates can be minimized during the mixing phase, yet accelerated after the formulation has been dispensed between the substrates. The system and techniques described herein are particularly advantageous in facilitating the large scale manufacturability of holographic media.

Additional details of one or more embodiments of the invention are set forth in the accompanying drawings and the description below. Other features, objects, and advantages of the invention will become apparent from the description and drawings, and from the claims.

DETAILED DESCRIPTION

The invention is directed to holographic data storage media fabrication techniques and various systems and methods for use in the fabrication of holographic data storage media The system and methods described herein allow for fabrication of such media within reasonable cycle times, such as less than one minute, and adhere to stringent requirements for optical clarity and parallelism to ensure optimal performance of the media. The system and techniques can be used to improve the large scale manufacturability of such media.

Typical holographic media have a sandwich construction in which a holographic media formulation is sandwiched between two substrates. The holographic media formulation includes two or more components. Depending on the components used for the formulation, the time it takes the formulation to cure can vary. In accordance with the invention, it is desirable to control the cure rate of the formulation in the various phases of the fabrication process. An accelerated cure rate in the mixing phase is undesirable because it can create a dynamic material viscosity through the mixer that may cause striations in the formulation or undesirable back-pressure in the dispensing phase.

The static mixer mixes the formulation in multiple stages to produce a homogeneous formulation without substantially accelerating the cure rate. A dispense nozzle dispenses the formulation between two substrates, which are held within a cavity. The dispense nozzle may be coated with a release element such as boron oxide to reduce the adhesion to the formulation and improve release from the substrates. The cavity holds the substrates parallel to within one optical fringe and may be pre-aligned, i.e., prior to dispensing the formulation, or dynamically adjusted either before, after or while the formulation is dispensed.

In order to achieve fabrication cycle times of less than one minute, heat or radiation is applied after the formulation is dispensed in order to accelerate the cure rate of the dispensed formulation so that the formulation becomes physically stable between the substrates and the medium can be removed from the cavity without compromising the medium. The perimeter of the holographic media may also be cured to seal the media from environmental degradation. Additionally, an optical cure may be used to secure a hub to a centerhole of the medium, e.g., using an ultraviolet curable adhesive, or simply by curing the holographic media formulation about the hub.

Figure 1A:
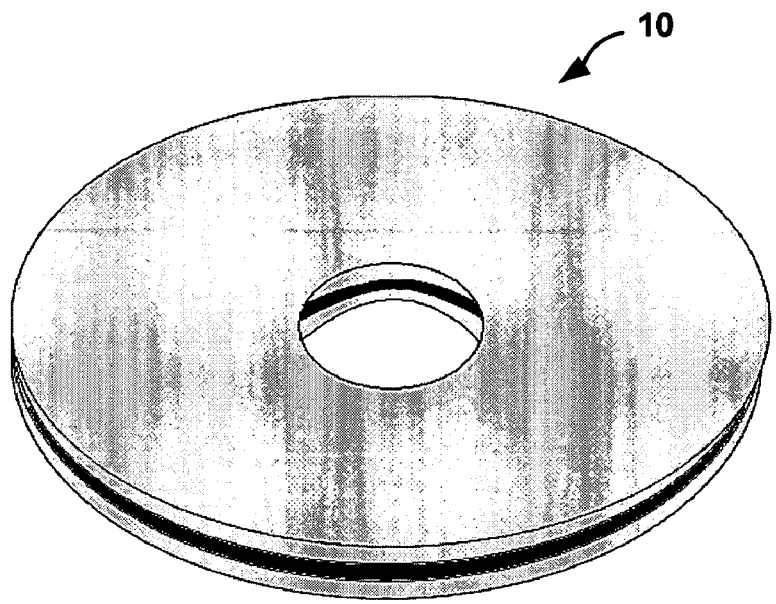
FIG. 1A is a perspective view of an exemplary holographic data storage medium that can be created according to an embodiment of the invention.
Figure 1B:
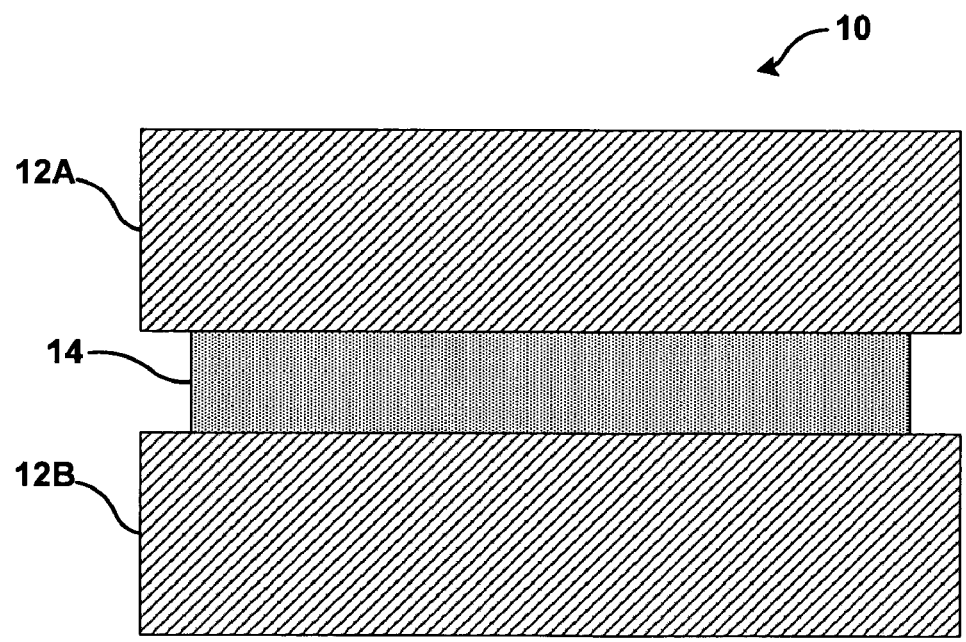
FIG. 1B is a cross-sectional view of the exemplary holographic data storage medium in FIG. 1A.

FIGS. 1A and 1B are different views illustrating an exemplary holographic data storage medium 10 that can be created using the techniques or systems described herein. FIG. 1A is a perspective view of disk shaped holographic data storage medium 10 with high optical clarity and parallelism. FIG. 1B is a cross-sectional view further illustrating the sandwich construction of medium 10. Although illustrated as being disk shaped, medium 10 could alternatively assume other geometries, such as a card-shape or any other shape. As illustrated, medium 10 includes two substrates 12A and 12B. Substrates 12A and 12B may be formed of a thermoplastic material such as polycarbonate, amorphous polyolefin or Poly methyl methacrylate (PMMA). Desirable substrate thickness may fall between 0.5 and 2.0 millimeters in order to achieve a desirable balance between birefringence, stiffness, and the edge wedge phenomenon. Multi-chemistry holographic formulation 14 is sandwiched between substrates 12A and 12B.

Multi-chemistry holographic formulation 14 is formed of two or more components. In the following description, a system is primarily described in the context of a two-chemistry formulation, but the same principles could be extended for use with three-chemistry formulations, four-chemistry formulations, and so forth.

Holograms of bit maps can be recorded and stored in multi-chemistry holographic formulation 14 to facilitate data storage. For example, a two-chemistry urethane formulation may be formed of a first isocyanate component including a photoinitiator and a second polyol component including an acrylate write monomer. Additives or other components may also be included, such as a catalyst to increase the rate at which the formulation cures or sets. The additive may be included in either or both components of the two-chemistry formulation or may be introduced as a separate component, e.g., of a three-chemistry formulation. As will be described in greater detail below, multi-chemistry holographic formulation 14 is created by mixing the various components. In particular, a system is described which substantially avoids curing during the mixing phase and accelerates the cure following injection of the formulation between the two substrates.

Holographic data storage medium 10 is fabricated to provide improved performance. Performance of medium 10 can be affected by the physical properties of multi-chemistry holographic formulation 14 and the fabrication process of medium 10. The physical properties of multi-chemistry holographic formulation 14 which can affect the performance of medium 10 include the dynamic range, the photosensitivity, and shrinkage characteristics. The dynamic range of multi-chemistry holographic formulation 14 provides a measure of the number of holograms that can be stored in a common volume for a given diffraction efficiency. Photosensitivity of multi-chemistry holographic formulation 14 is a measure of sensitivity to electromagnetic energy. Higher levels of photosensitivity provide for higher diffraction efficiency and lower scattering affects, which is desirable. Multi-chemistry holographic formulation 14 exhibiting low shrinkage ensures that formulation 14 substantially maintains its original form following dispense between substrates 12A, 12B.

The performance of holographic data storage medium 10 can also be affected by the fabrication process. As will be described in greater detail below, multi-chemistry holographic formulation 14 is mixed in a manner that ensures that a homogeneous formulation is obtained. Moreover, curing of multi-chemistry holographic formulation 14 is substantially avoided during the mixing phase, yet accelerated after formulation 14 is dispensed between substrates 12A and 12B.

Figure 2:
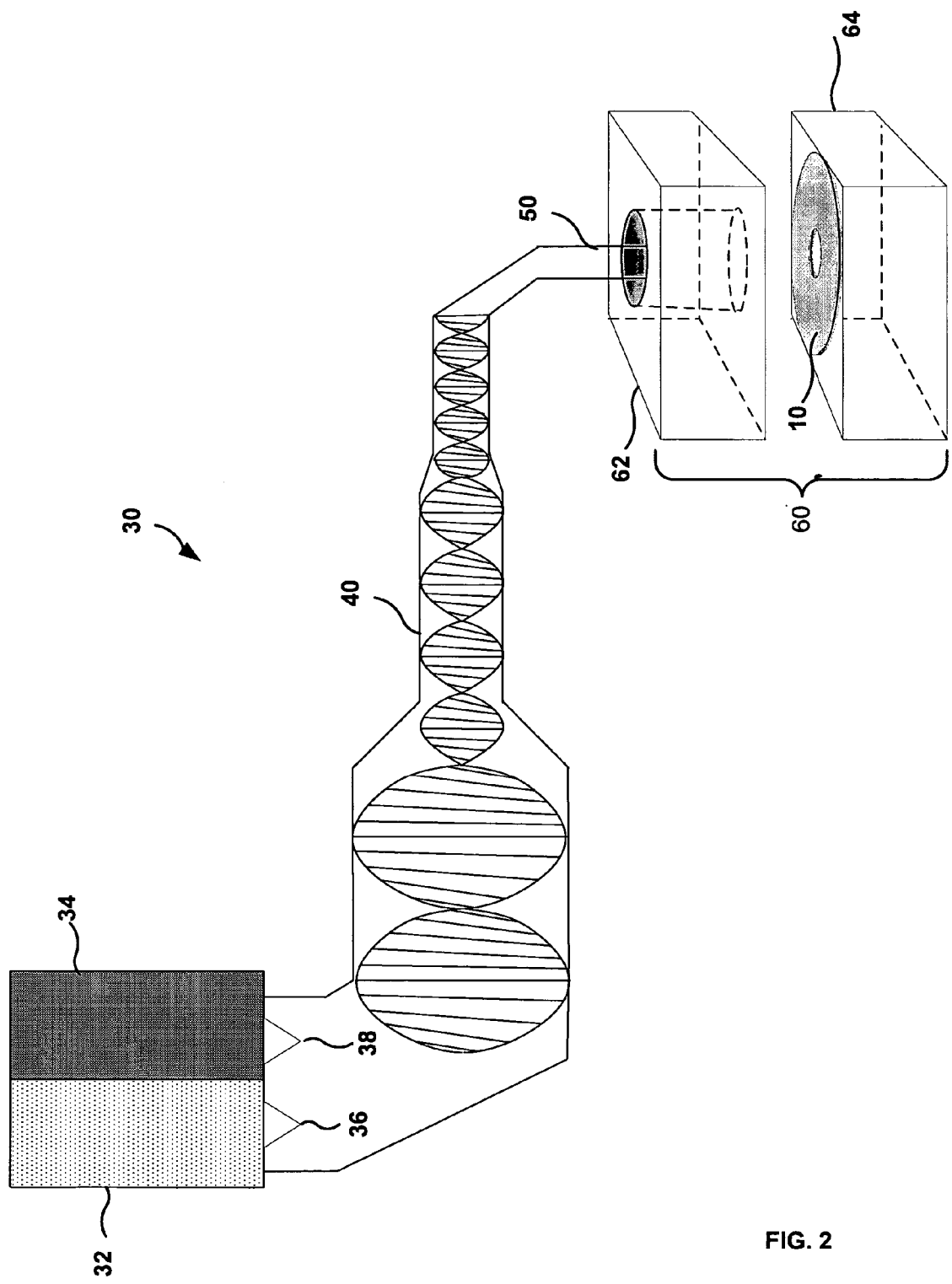
FIG. 2 is a conceptual diagram illustrating an exemplary system for fabricating holographic data storage media according to one embodiment of the invention.

FIG. 2 is a sequential, repetitive, dispense system facilitating large scale fabrication of holographic data storage media. In particular, system 30 fabricates holographic data storage media within reasonable cycle times while adhering to stringent requirements for optical clarity and parallelism. However, this embodiment of the present invention should be taken as exemplary of the type of system in which various embodiments of the present invention may be embodied, and not as limiting, as other embodiments of the invention may be practiced in a wide variety of system implementations.

System 30 includes reservoir 32 to hold a first component and reservoir 34 to hold a second component of multi-chemistry holographic formulation 14. For example, an isocyanate component including a photoinitiator and a polyol component including an acrylate write monomer may be used to form a two-chemistry urethane formulation. Additives or other components may also be included, such as a catalyst to increase the rate at which multi-chemistry holographic formulation 14 cures, or a photosensitive dye which can be illuminated to generate heat and thereby increase the cure rate.

In some embodiments, the isocyanate component and polyol component may have equivalent weights allowing a 2:1 volume ratio mix to achieve a near equal amount of each reactive group. Adding non-reacting ingredients to the components such as the acrylate write monomer, photoinitiator, and catalyst creates an excess of isocyanate. However, it is preferable to have a slight excess of polyol to ensure that all of the isocyanate chemically reacts with the polyol rather than left to potentially react with environmental moisture. A 2:1 volume ratio mix can be achieved by selecting a polyol of lower equivalent weight. Reservoirs 32 and 34 prevent the two components from reacting prior to being added to mixer 40. Mixer 40 receives the two components from reservoir 32 and 34 via valves 36 and 38 respectively. Valves 36 and 38 can be controlled to provide mixer 40 with the desired ratio of the two components. Reservoirs 32, 34 may be pressurized in a controlled fashion so that a quantified amount of the components is dispensed through mixer 40 when valves 36 and 38 are opened.

Mixer 40 mixes the two components of multi-chemistry holographic formulation 14 in multiple stages producing a homogeneous formulation without substantially accelerating the cure rate. In accordance with the invention, mixer 40 may include a first stage with a first set of mixing elements and second stage with a second set of mixing elements. The mixing elements in the first stage are larger than the mixing elements in the second stage. Additional stages with progressively smaller mixing elements may also be used, e.g., a third stage with mixing elements smaller than the second stage, a fourth stage with mixing elements smaller than the third stage, and so forth. Moreover, the mixing should be performed as quickly as possible in order to support large scale manufacturing with quick cycle times. At the same time, however, curing of the formulation should be substantially avoided during the mixing phase, yet accelerated after the formulation is injected between the substrates.

Dispense nozzle 50 receives the mixed formulation from mixer 40 and center dispenses multi-chemistry holographic formulation 14 between substrates 12A, 12B. In particular, formulation 14 is dispensed through a hole in substrate 12A. Dispense nozzle 50 may also seal the hole to prevent formulation 14 from escaping through the hole. Fluid containment features (not shown) on the edges of substrates 12A, 12B may help ensure that hydraulic pressure is maintained and that formulation 14 does not also escape from edges of substrates 14A, 14B.

Cavity 60 holds the substrates 12A and 12B parallel to within one optical fringe and provides fluid containment features in proximity to outer edges of the respective substrates. As will be described in greater detail below, the cavity may be pre-aligned, i.e., prior to the fabrication process, or dynamically adjusted during the fabrication process. Optical flats 62 and 64 function as reference planes and substrates 12A, 12B are forced against optical flats 62, 64 to ensure parallelism. Optical flats 62, 64 may be opaque stainless steel or optically transparent to aid in accelerating the cure rate of formulation 14 by heat or radiation respectively. For example, the optical flats 62, 64 may comprise mirror blocks similar to those used in conventional optical disk (CD and DVD) manufacturing, or optically transparent elements similar to conventional mirror blocks but made of transparent or translucent material. Substrates 12A, 12B may be inserted into cavity 60, e.g., using a robotic arm (not shown) or other automated system.

In order to ensure that holographic media formulation 14 is trapped between substrates 12A, 12B, fluid containment features (not shown) may be defined on the perimeters of substrates 12A, 12B. For example, the fluid containment features may define lip-like elements formed about an outer perimeter of respective substrates 12A, 12B. The fluid containment features of substrates 12A, 12B may fit together, e.g., in an abutting fashion, to substantially seal substrates 12A, 12B to one another when formulation 14 is cured between substrates 12A, 12B. Alternatively, a separate ring element, or the like, may be used to contain formulation 14 between the substrates 12A, 12B. In any case, substrates 12A, 12B can be inserted into cavity 60, e.g., using a robotic arm (not shown) or other automated system, and formulation 14 can be dispensed between substrates 12A, 12B.

Figure 11:
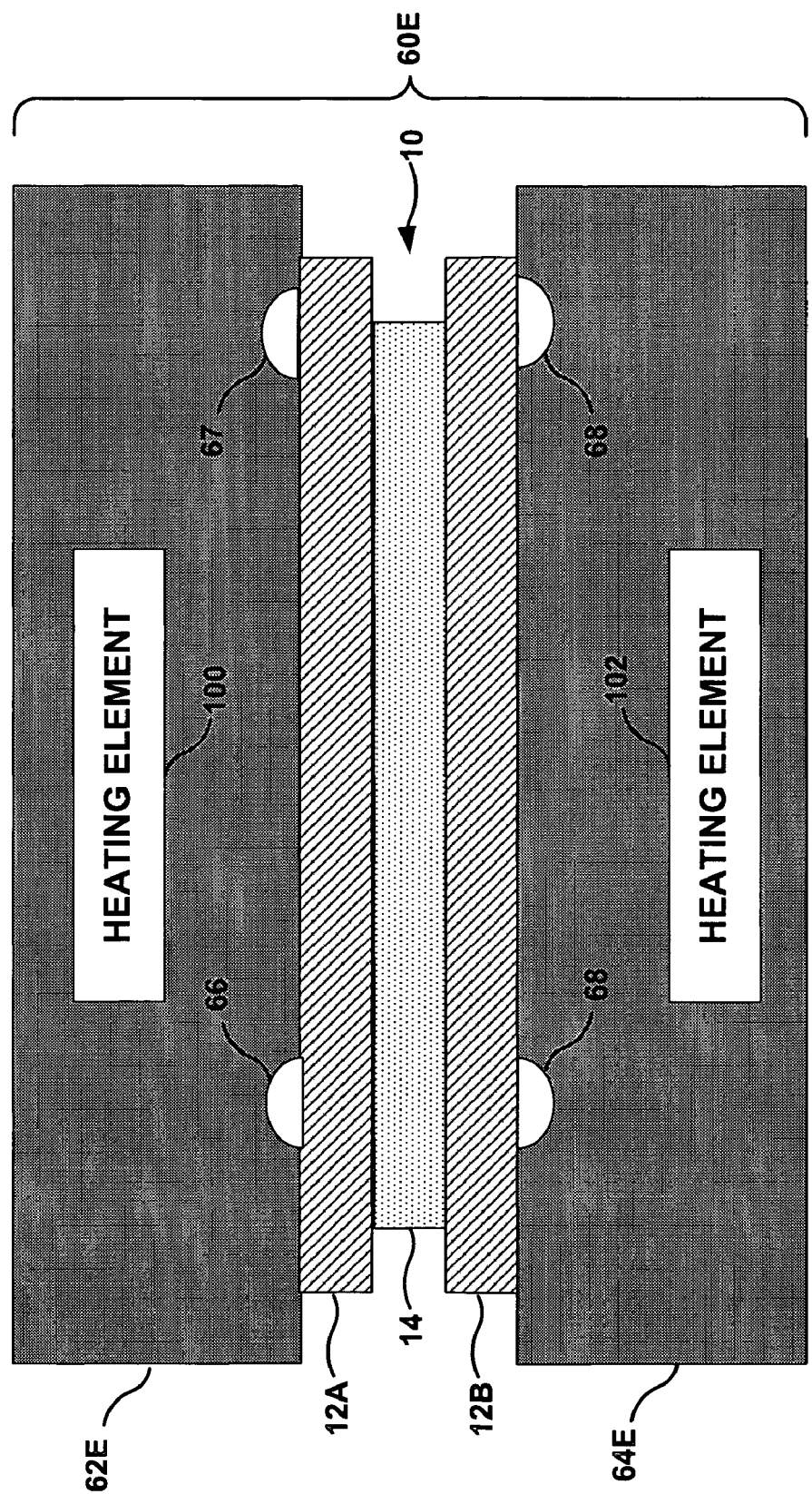
FIG. 11 is a cross-sectional side view of a cavity applying heat to a holographic medium in order to accelerate the cure rate of the holographic media formulation.
Figure 12:
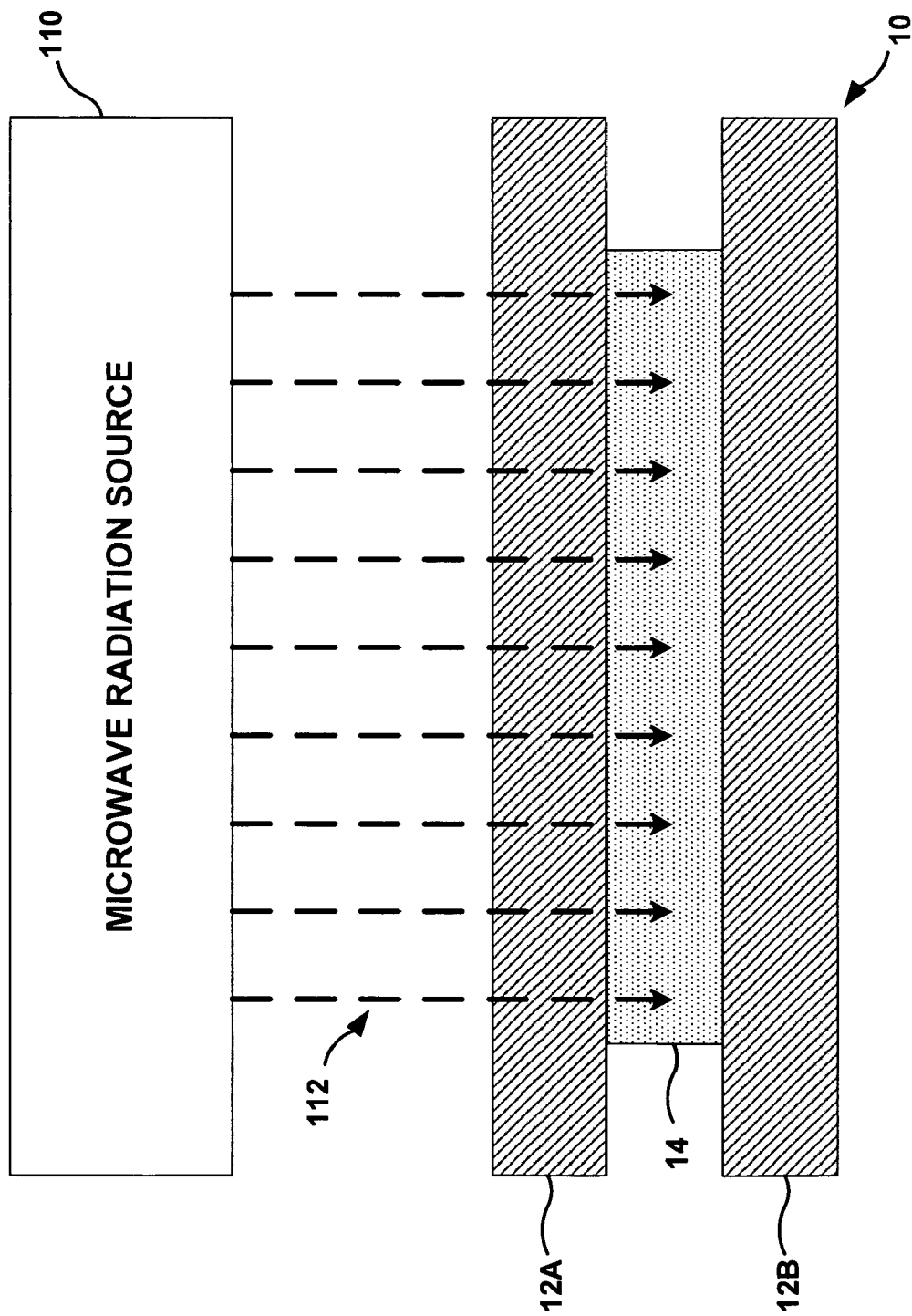
FIG. 12 is a cross-sectional side view of a cavity applying microwaves to a holographic medium in order to accelerate the curing rate of the holographic media formulation.
Figure 13:
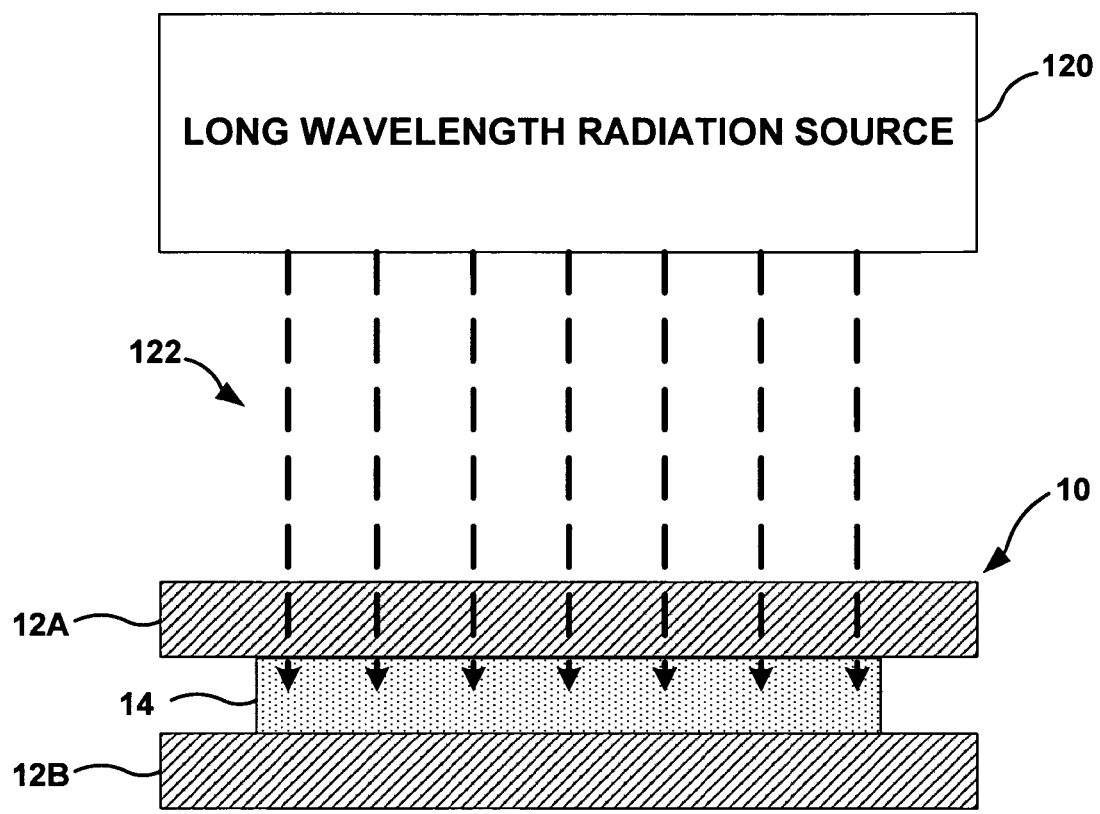
FIG. 13 is a cross-sectional side view of a cavity applying long wavelength optical radiation to a cavity holding a holographic medium in order to accelerate the curing rate of the holographic media formulation.

In order to achieve fabrication cycle times of less than one minute, system 30 applies heat or radiation (not shown in FIG. 2) after formulation 14 is dispensed, which accelerates the cure rate of the dispensed formulation 14. FIGS. 11, 12, and 13, discussed in greater detail below, illustrate the application of heat or radiation to accelerate the cure rate of formulation 14. Accelerating the cure rate of formulation 14 decreases the time required for formulation 14 to become physically stable between substrates 12A, 12B so that holographic data storage medium 10 can be removed from cavity 60 without compromising the quality of medium 10. Cavity 60 may be opened to facilitate removal of medium 10 by a robotic arm (not shown) or other automated system. Alternatively, shrinkage of formulation 14 may allow medium 10 to be removed from the cavity. Shrinkage is typically a few percent by volume, allowing medium 10 to be removed from cavity 60 without moving or making adjustments to the cavity.

The perimeter of holographic medium 10 may also be cured to seal medium 10 from environmental degradation before medium 10 is removed from cavity 60. Additionally, an optical cure may be used to secure a hub to medium 10 using an adhesive or by curing formulation 14 about the hub at the centerhole of medium 10.

Figure 3:
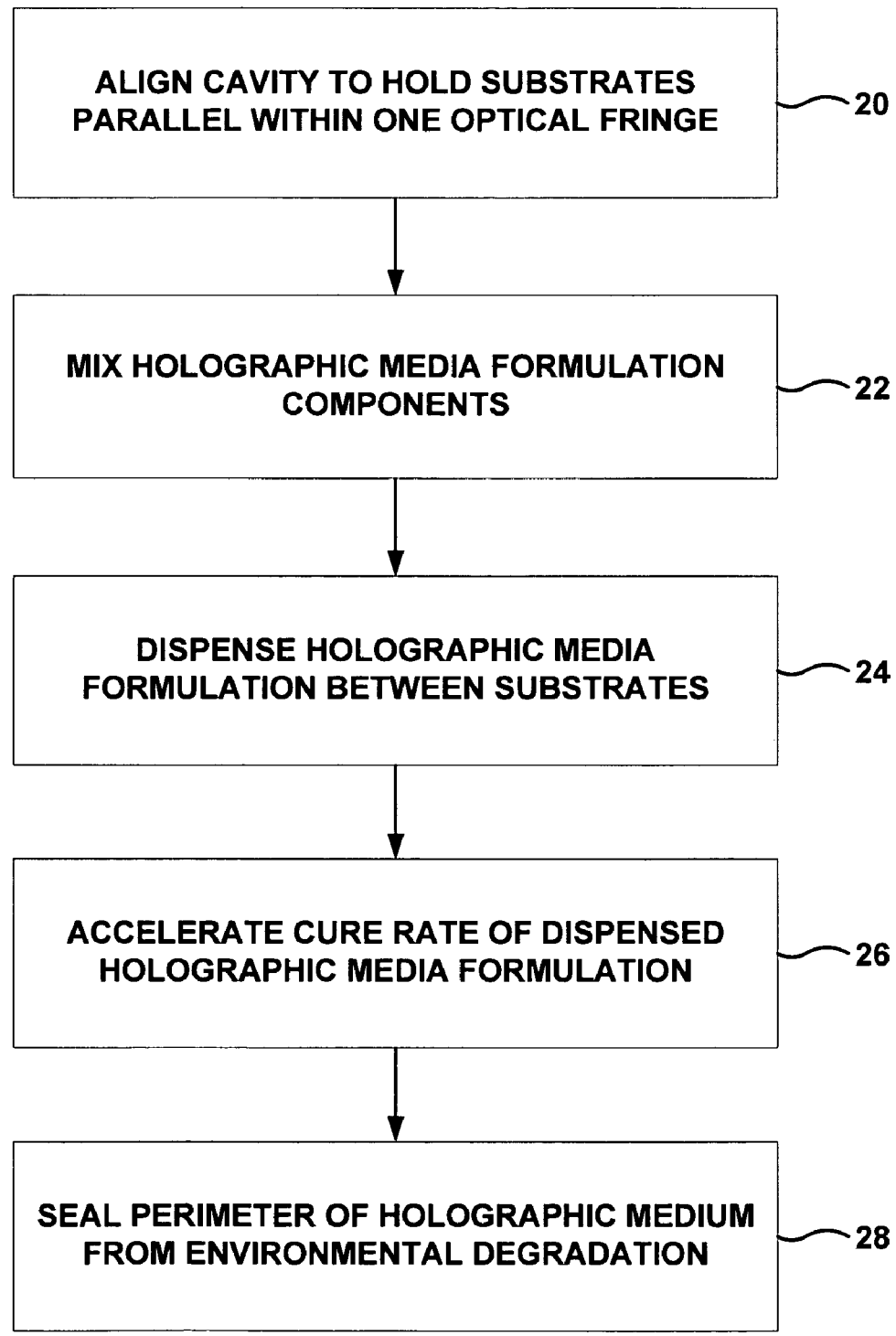
FIG. 3 is a flowchart illustrating an exemplary method of fabricating holographic data storage media.

FIG. 3 is a flowchart illustrating an exemplary sequential, repetitive, dispense method for fabricating holographic data storage media within reasonable cycle times while adhering to stringent requirements for optical clarity and parallelism. The steps of the illustrated method are described with respect to system 30 of FIG. 2. In accordance with various embodiments of the invention, various techniques of the method illustrated in FIG. 3 may be used with or without other techniques of the illustrated method.

The solidification of a multi-chemistry holographic formulation is a rate-limiting factor in the fabrication process of holographic data storage media. The feasibility of the fabrication method depends, at least in part, on the ability to homogenously mix two component multi-chemistry holographic formulation 14 without accelerating the cure rate of formulation 14. Accordingly, to accelerate fabrication cycles, the cure rate of multi-chemistry holographic formulation 14 should be accelerated following dispense of formulation 14 between substrates 12A, 12B such that holographic data storage medium 10 can be removed from cavity 60 within a reasonable fabrication cycle time. Removing medium 10 prematurely from cavity 60 may compromise the performance of medium 10. The illustrated method can achieve reasonable media fabrication rates of less than one minute.

In order to meet desirable levels of parallelism, the cavity is aligned to hold substrates 12A and 12B parallel within one optical fringe (20). In this case, cavity 60 is pre-aligned, i.e., prior to the fabrication process. An open loop method, i.e., not requiring a feedback signal to correct deviations from parallelism, may be used to pre-align cavity 60. Prior to dispensing multi-chemistry holographic formulation 14, optical flats 62 and 64 are positioned parallel to one another in order to ensure parallelism of resultant media to within one optical fringe. Once optical flats 62 and 64 are positioned, cavity 60 is left without corrective adjustments for several cycles. If desired or needed, alignment may be performed again after many fabrication cycles. Alternatively, cavity 60 may be dynamically adjusted during the fabrication process.

For example, cavity 60 may be dynamically adjusted after formulation 14 is dispensed between substrates 12A, 12B or after medium 10 has been removed from cavity 60. Feedback may be provided by position sensors monitoring three or more points of cavity 60. Alternatively, optical interferometry may be used to adjust cavity 60 and thereby ensure parallelism of fabricated media. Cavity 60 may be gimbal mounted to enable dynamically adjusting cavity 60 after each fabricated media.

Figure 5:
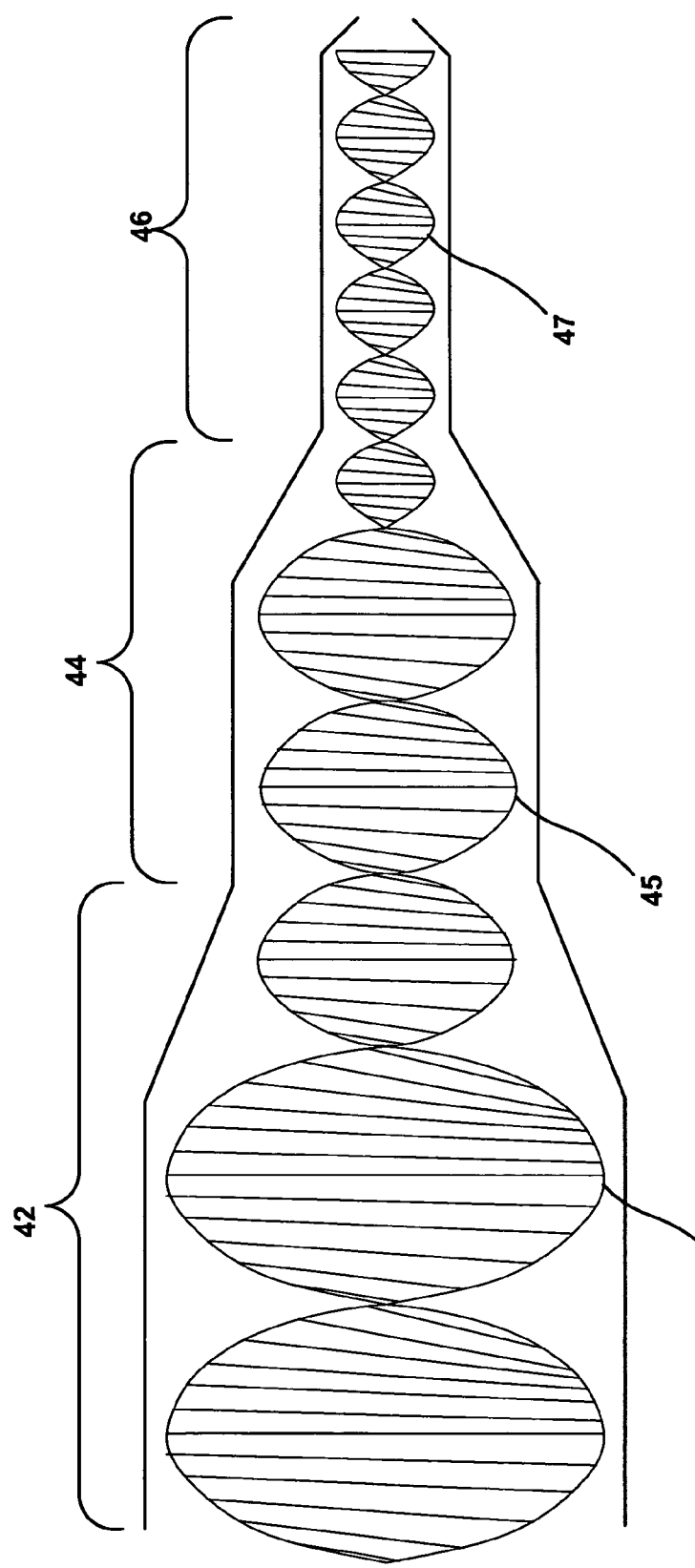
FIG. 5 is a conceptual diagram illustrating a mixer with first, second, and third stages according to one embodiment of the invention.

Multi-chemistry holographic formulation 14 is created by mixing at least two components (22). As previously described, a two-chemistry urethane formulation may be formed using an isocyanate component including a photoinitiator and a polyol component including an acrylate write monomer. Additives or other components may also be included, such as a catalyst to increase the rate at which multi-chemistry holographic formulation 14 cures. Mixer 40 mixes formulation 14 in multiple stages of mixer 40 with each stage including static mixing elements. The static mixing elements of each stage are progressively smaller than the mixing elements of the previous stage. FIG. 5 illustrates mixer 40, and is described in greater detail below.

The mixing of formulation 14 in multiple stages with progressively smaller static mixing elements produces a homogeneous formulation and ensures that substantially no flow lines are created when formulation 14 is dispensed without substantially accelerating the cure rate. Static mixing has the advantage over other mixing techniques in that static mixing generally does not generate excessive heat in the mixture which could undesirably accelerate the chemical reaction and causes the mixture to cure in the mixer. An accelerated cure rate of formulation 14 in the mixing phase could create a dynamic material viscosity through mixer 40, which is undesirable because dynamic material viscosity can cause stress induced striations in formulation 14 or undesirable back-pressure in dispense nozzle 50. In any case, the mixing should be performed as quickly as possible in order to support large scale manufacturing with quick cycle times.

Dispense nozzle 50 center dispenses multi-chemistry holographic formulation 14 between substrates 12A, 12B (24). In particular, formulation 14 is dispensed through a hole in substrate 12A. In that case, dispensing formulation 14 between substrates 12A, 12B may hydraulically force substrates 12A, 12B against pre-aligned cavity 60. Fluid containment features on the edges of substrates 12A, 12B may help ensure that hydraulic pressure is maintained and that formulation 14 does not escape from edges of substrates 12A, 12B. Alternatively, the cavity may include features to ensure that formulation 14 does not escape from edges of substrates 12A, 12B.

After dispensing, some volume of formulation 14 may remain in dispense nozzle 50. This volume of formulation 14 may be purged into a waste pot prior to dispensing in the next cycle or dispensed into the next media in the sequence. For example, the volume of formulation 14 remaining in dispense nozzle 50 may cause undesirable back-pressure in mixer 40 and stress induced striations in formulation 14. Formulation 14 should be dispensed as quickly as possible in order to limit the difference in the degree of cure between the volume of formulation 14 that has exited dispense nozzle 50 and the volume of formulation 14 remaining in nozzle 50.

Dispense nozzle 50 may be coated with a release element such as boron oxide to reduce adhesion of formulation 14 to nozzle 50. Coating dispense nozzle 50 with the release element may further reduce friction between dispense nozzle 50 and substrates 12A, 12B, thereby improving the release of nozzle 50 from between the substrates. Prior to removal of medium 10 from cavity 60, multi-chemistry holographic formulation 14 should be substantially cured so that removal from the cavity does not distort medium 10. Removing medium 10 from cavity 60 prematurely may compromise the performance of medium 10.

Once formulation 14 is dispensed, the cure rate is accelerated for the dispensed formulation 14 (26). In particular, acceleration of the cure rate of multi-chemistry holographic formulation 14 improves large scale manufacturability of holographic media by reducing fabrication cycle times. In various phases of the fabrication process, it is desirable to adjust the cure rate. Preferably, curing of formulation 14 should be avoided during the mixing phase, yet accelerated after formulation 14 is dispensed between the substrates. The curing of formulation 14 in the mixing phase creates a dynamic material viscosity through mixer 40 that may cause stress induced striations in formulation 14 or undesirable back-pressure in dispense nozzle 50. However, after formulation 14 is dispensed between substrates 12A, 12B, formulation 14 should cure quickly so that holographic medium 10 can be removed from cavity 60 without compromising the performance of medium 10 in a short amount of time, e.g., less than a minute.

System 30 applies heat or radiation to medium 10 to accelerate the cure rate of formulation 14 after formulation 14 has been dispensed between substrates 12A, 12B. Optical flats 62, 64 may be opaque stainless steel or optically transparent to aid in accelerating the cure rate of formulation 14 by heat or radiation respectively. FIG. 11 illustrates dual sided application of heat to medium 10, and is described in greater detail below. In other embodiments, radiation is applied to medium 10 to accelerate the cure rate of formulation 14. For example, microwaves may be used in addition to or conjunction with thermal energy to accelerate the cure rate. Also, radiation which is insensitive to the write monomer but sensitive to an additive dye may be applied to generate heat in formulation 14 without impacting the write monomer.

Preferential absorption of microwaves or other radiation may be attained by creating a strong absorption coefficient in formulation 14 or by design of a cavity to provide a concentrated intensity of microwaves in formulation 14. FIG. 12 illustrates the application of microwaves to accelerate the cure rate of formulation 14, and is also described in greater detail below.

Other optical radiation may also be used to thermally switch and heat formulation 14 uniformly across the entire surface of medium 10. For example, formulation 14 may incorporate a photoabsorbing dye with wavelength much longer than the write photoinitiator range. In particular, the long wavelength radiation can be matched to a photoabsorbing dye in the formulation. Further, to prevent scattering of the recording or readout beams, the long wavelength radiation should be optically matched to formulation 14. FIG. 13 illustrates the application of long wavelength radiation to accelerate the cure rate of formulation 14. Again, performing accelerated curing techniques only after the formulation has been dispensed helps avoid any unwanted curing during the mixing phase while still improving cycle times.

Figure 14:
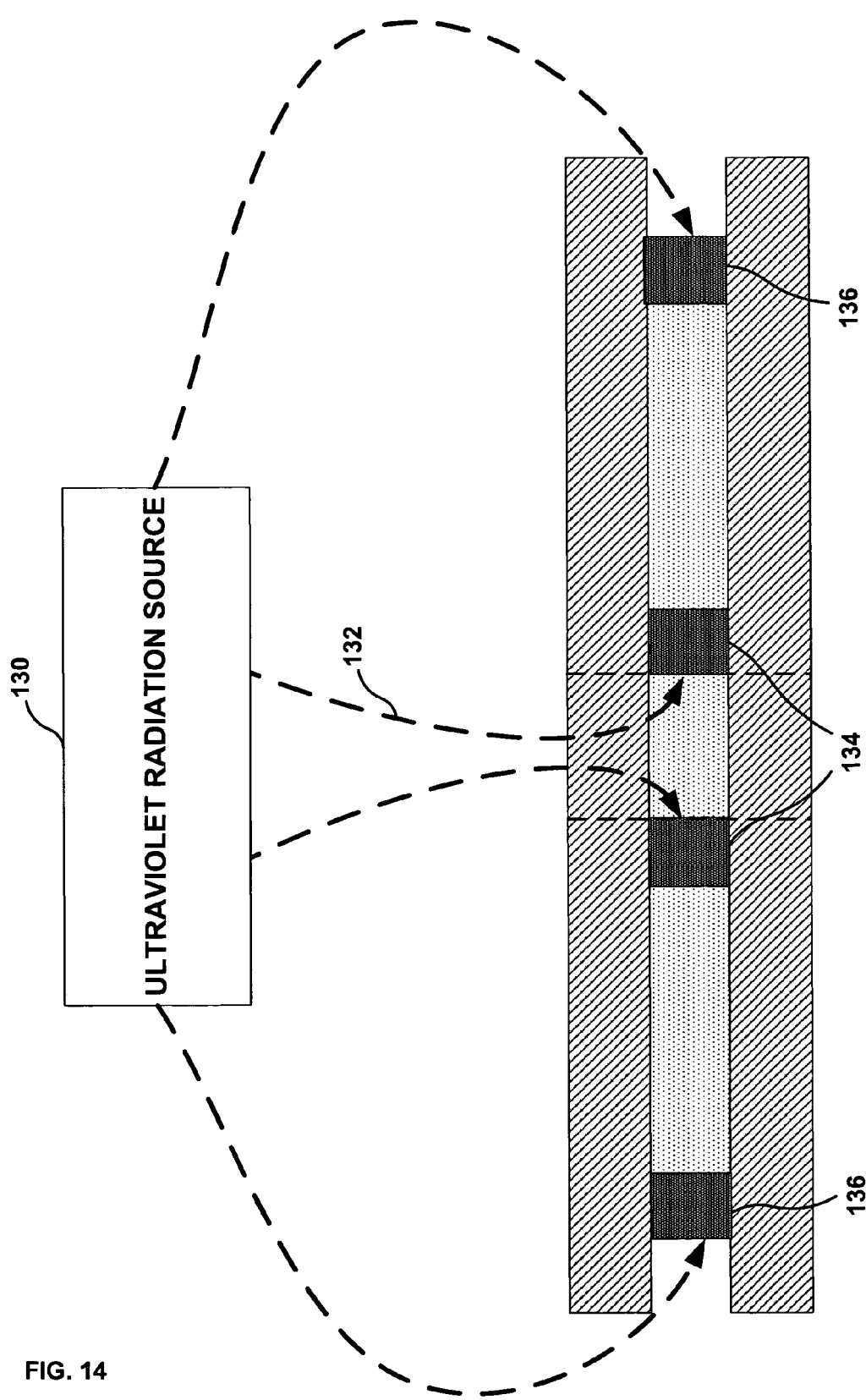
FIG. 14 is a cross-sectional view of a holographic data storage medium having a perimeter seal to protect from environmental degradation.

The perimeter, i.e., the outer diameter of medium 10, can be sealed to protect medium 10 from environmental degradation (28). Moisture from the atmosphere may absorb and react with formulation 14, reducing the storage capacity of medium 10. Controlled application of ultraviolet radiation around the perimeter of medium 10 seals medium 10 from environmental degradation. A trade-off exists, however, between lost holographic recording volume and increased immunity to environmental degradation with increased cure depth. Immunity to environmental degradation increases with increased depth of cure of the perimeter. The cure depth may be controlled by choice of ultraviolet radiation wavelength and the absorption coefficient of formulation 14. FIG. 14 illustrates the perimeter sealing medium 10 to avoid environmental degradation of the formulation.

Figure 4:
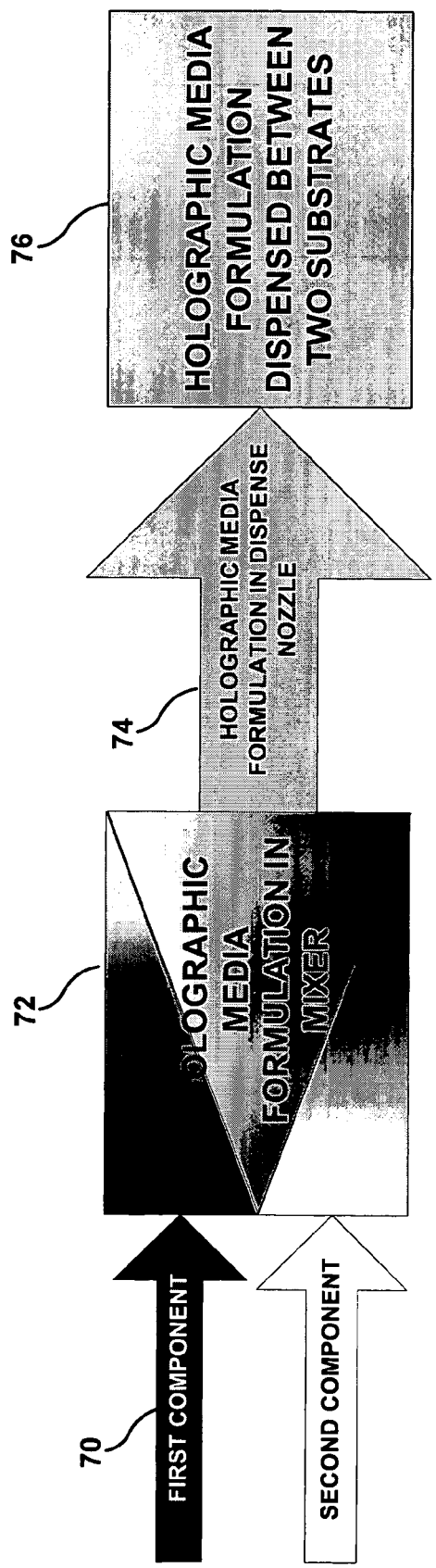
FIG. 4 is a block diagram illustrating the holographic media formulation at various phases in the fabrication process.

FIG. 4 is a block diagram illustrating multi-chemistry holographic media formulation 14 at various phases in the fabrication process of system 30. Before entering mixer 40, reservoirs 32 and 34 contain the first and second components of formulation 14, respectively, and the two components are completely unmixed and unreacted (70). Mixer 40 receives the unmixed components and mixes the components in three stages (72) to produce a homogeneous mixture as previously described. The degree of mixing increases through the stages from 0% to 100%. The static mixing elements of mixer 40 statically mix the components of formulation 14 without accelerating the cure rate. Static mixing generally does not generate excessive heat in the mixture, which could undesirably accelerate the chemical reaction and cause the mixture to cure in mixer 40. Therefore, the degree to which formulation 14 cures is controlled by the amount of catalyst in formulation 14 and the time elapsed during mixing.

After formulation 14 is homogeneously mixed, dispense nozzle 50 receives an amount of formulation 14 to be dispensed in holographic data storage medium 10 (74). For example, 25 grams of formulation 14 may be needed to fabricate medium 10. Dispense nozzle 50 then dispenses formulation 14 between substrates 12A, 12B held in cavity 60 (76). However, following the dispense of formulation 14, there may remain some volume of formulation 14 remaining in dispense nozzle 50.

This volume of formulation 14, e.g., approximately 2 grams, is homogeneously mixed but does not follow medium 10 with the sequential process 74. The volume of formulation 14 remaining in dispense nozzle 50 may substantially cure to create striations or undesirable back-pressure during the dispensing phase. For this reason, the volume of formulation 14 remaining in dispense nozzle 50 may be purged into a waste pot. In other embodiments, this volume of formulation 14 is dispensed as the first fraction of mixture in the next holographic media.

Dispense nozzle 50 may be coated with a release element such as boron oxide to reduce adhesion of formulation 14 to nozzle 50 allowing the entire volume of formulation 14 in nozzle 50 to be dispensed between substrates 12A, 12B. In any case, formulation 14 should be dispensed as quickly as possible in order to limit the difference in the degree of cure between the volume of formulation 14 that has exited the dispense nozzle and the volume of formulation 14 remaining in the nozzle.

FIG. 5 illustrates three stage in-line "step down" static mixer 40. Mixer 40 receives a first component and a second component to create multi-chemistry holographic formulation 14 from reservoirs 32 and 34 via valves 36 and 38 respectively. Again, reservoirs 32, 34 may be pressurized so that opening of valves causes the components to flow through mixer 40.

Mixer 40 includes a first stage 42 with a first set of mixing elements 43 and second stage 44 with a second set of mixing elements 45. The mixing elements in the first stage 43 are larger than the mixing elements in the second stage 45. The third stage 46 of mixer 40 includes mixing elements 47 that are smaller than the mixing elements in the second stage 45. Additional stages with progressively smaller mixing elements may also be used, e.g., a fourth stage with mixing elements smaller than the third stage, and so forth. Mixing elements 43, 45, 47 are static mixing elements and may be helical in shape. Static mixing elements refer to elements that do not move. Pressure forces the components through such non-movable static mixing elements, and mixing occurs as the formulation is forced through the non-movable static mixing elements. Dynamic or movable mixing elements, however, could also be used. In any case, mixing should be performed as quickly as possible in order to support large scale manufacturing with quick cycle times. At the same time, however, curing of the formulation should be substantially avoided during the mixing phase.

For example, mixer 40 may be physically realized by splicing commercially available step down static mixer with part number MA 0517-0413 from Conveniently Packaged Adhesive (CPA) of Cranston, R.I. with commercially available 24 element static mixer from Liquid Control of North Canton, Ohio. The two step static mixer available from CPA includes a first stage of 17 helical elements with an inner diameter of 0.213 inches (0.541 millimeters) and a second stage of 13 helical elements with an inner diameter of 0.15 inches (3.81 millimeters). The static mixer from Liquid Control includes 24 helical elements with an inner diameter of 0.125 inches (3.175 millimeters) is spliced with the static mixer from CPA to form the third stage of the three stage in-line step down static mixer 40.

The three stages 42, 44, and 46 of mixer 40 with mixing elements 43, 45, and 47 respectively serve to create a homogeneous mixture that does not create flow lines when dispensed between substrates 12A, 12B. The various stages and static mixing elements of mixer 40 statically mix formulation 14 without generating excessive heat. Dynamic or movable mixing elements, in contrast, would likely create more heat during the mixing process, which is undesirable.

Optical clarity requirements may affect the configuration of mixer 40. Formulation 14 is generally created to improve holographic recording performance rather than for processing parameters, such as viscosity. Thus, the viscosity of the formulation may be limited insofar as viscosity adjustments can be made to formulation 14 without sacrificing performance. The static mixer configuration is defined by the number of mixing stages, number of mixing elements per stage, and the length of the mixer. In this way, a mixing element material volume and flow resistance is dictated by the static mixer. This configuration of the static mixer, in turn, dictates the driving pressure needed to compel the homogenous mixture into the next stage of the mixer. Pragmatically, the limit for driving pressure for the mixer to receive the two components depends on the degree to which the mixture cures during mixing. The degree to which the mixture cures during mixer may depend on catalyst levels in the mixture, the latency between dispensing cycles, and the temperature of the mixture.

Because mixer 40 does not substantially elevate the temperature of formulation 14 during mixing, the cure rate is generally affected by the level of catalyst in formulation 14 and the latency between dispensing cycles. The latency, in this case, can be decreased by accelerating the cure rate after formulation 14 is dispensed between substrates 12A, 12B. A catalyst level too high for the given latency results in excessive curing during the mixing process. This, in turn, can result in inadequate pressure to dispense formulation 14. In other words, mixer 40 can become clogged or unable to dispense formulation 14 if too much curing occurs between cycles. On the other hand, a catalyst level too low for a given latency requires additional time to cure formulation 14 after being dispensed.

Catalyst levels in the formulation can be increased as long as the driving pressure requirement is not exceeded. In short, the catalyst levels, latency between cycles, and accelerated curing techniques can all be defined to improve large scale manufacturability of holographic media.

Figure 6:
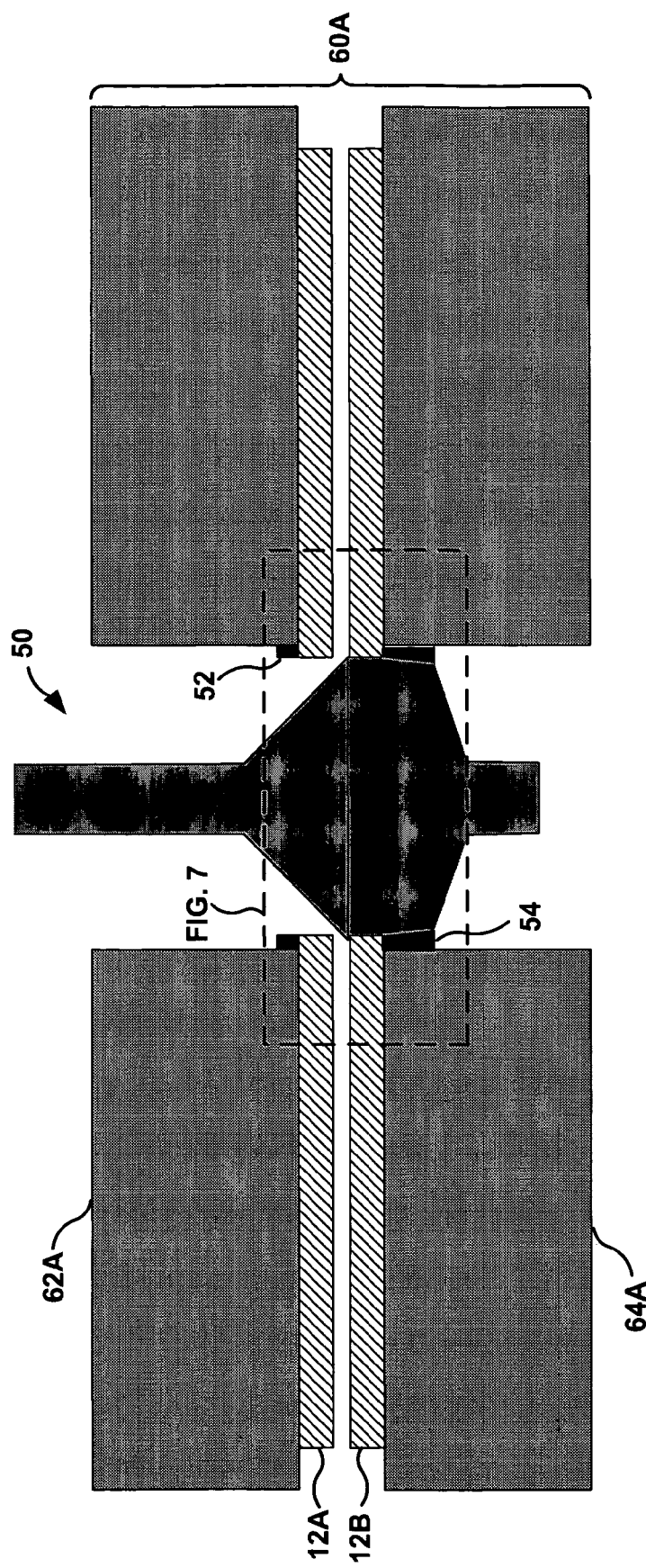
FIG. 6 is a cross-sectional view of a dispense nozzle inserted into a cavity for holographic media formation according to an embodiment of the invention.
Figure 7:
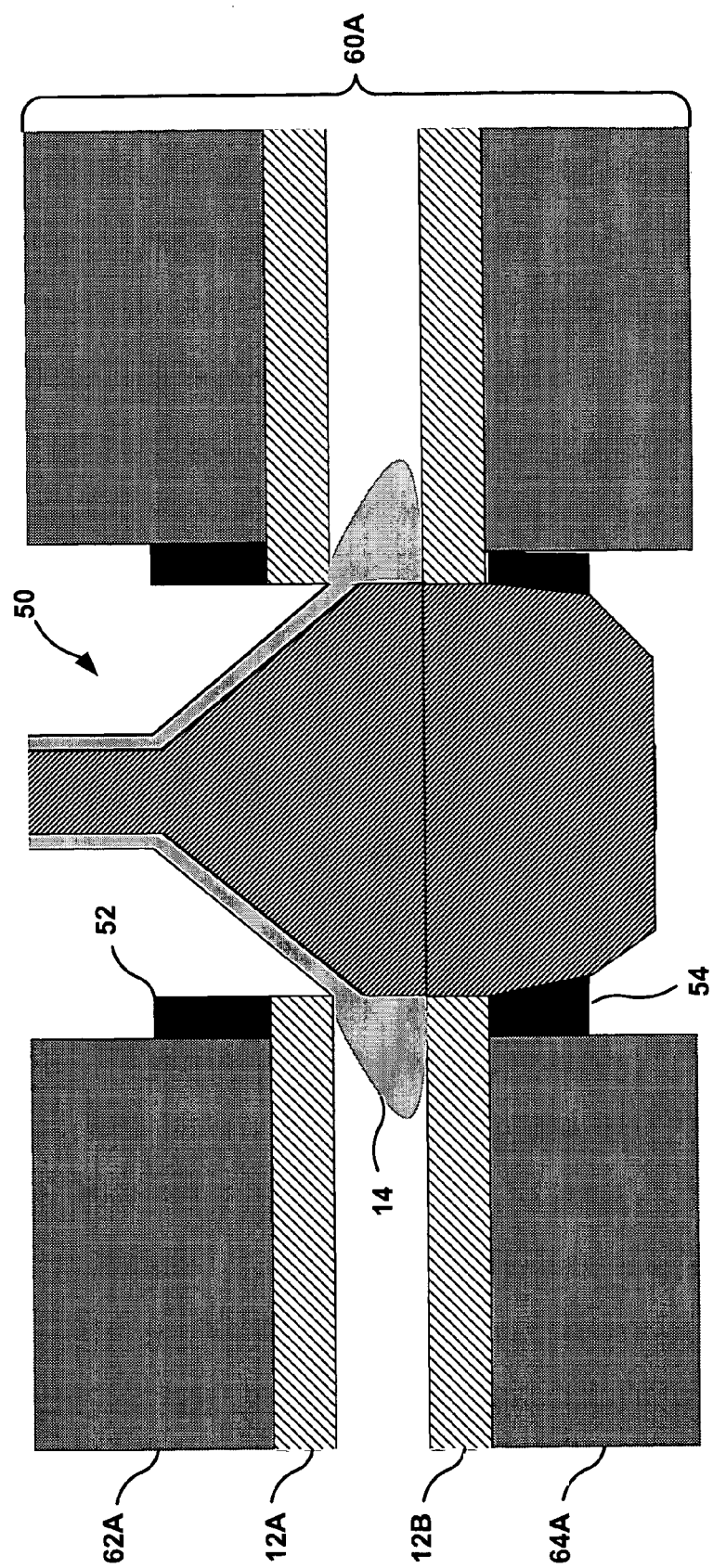
FIG. 7 is an enlarged cross-sectional view of the dispense nozzle inserted into a cavity for holographic media formation.

FIG. 6 is a cross-sectional view of dispense nozzle 50 located in the inner diameter hole of a cavity 60A holding holographic data storage medium 10. FIG. 7 is an enlarged view of FIG. 6 further illustrating dispense nozzle 50 dispensing multi-chemistry holographic formulation 14 between substrates 12A and 12B through the inner diameter hole of cavity 60A and a center hole of substrates 12A and 12B. In some embodiments, multi-chemistry holographic formulation 14 is dispensed through a center hole of substrate 12A while substrate 12B is solid, i.e., not including any center-hole. Dispense nozzle 50 center dispenses multi-chemistry holographic formulation 14 between substrates 12A and 12B such that substantially no flow lines are created. Additionally, dispensing formulation 14 between substrates 12 may hydraulically force the substrates against the pre-aligned cavity. Again, substrates 12 may include fluid containment features to ensure that the formulation does not leak from the perimeter edge of the medium as formulation 14 is dispensed.

After dispensing, some volume of formulation 14 may remain in the dispense nozzle. This volume of formulation 14 may be purged into a waste pot prior to dispensing in the next cycle or may be dispensed into the next media in the sequence. The volume of formulation 14 remaining in the dispense nozzle may cause undesirable back-pressure in the mixer and stress induced striations. To help avoid such problems, formulation 14 should be dispensed as quickly as possible and the cure rate accelerated for the dispensed formulation. This can limit the difference in the degree of cure between the volume of formulation 14 that has exited the dispense nozzle and the volume of formulation 14 remaining in the nozzle.

Dispense nozzle 50 may be coated with a release element such as boron oxide to reduce friction between the nozzle and the substrates, thereby improving the release of the nozzle from between the substrates for improved removal of the created media from cavity 60A. For example, a saturated aqueous solution of boric acid may be applied to dispense nozzle 50. Dispense nozzle 50 may then be exposed to air to oxidize to boron oxide producing a modified surface with low adhesion to plastics. Reducing adhesion of formulation 14 to nozzle 50 prevents accumulation of formulation 14 on nozzle surface. In some embodiments, dispense nozzle 50 may be stainless steel. The boron oxide coating may improve the release of the nozzle from between the substrates for improved removal of the created media from cavity 60A. Prior to removal of medium 10 from the cavity, multi-chemistry holographic formulation 14 must stabilize so that removal from the cavity does not distort medium 10.

FIG. 7 illustrates an enlarged view of dispense nozzle 50 center dispensing multi-chemistry holographic formulation 14 between substrates 12A, 12B through the inner diameter hole of cavity 60A and a center hole of substrates 12A, 12B. In some embodiments, multi-chemistry holographic formulation 14 is dispensed through a center hole of substrate 12A while substrate 12B does not include a centerhole. Substrates 12A, 12B are forced against pre-aligned optical flats 62A and 64A by the resulting hydraulic pressure. The fluid path may provide uniform flow outward along the radius of medium 10. Seals 52 and 54 function to fluid-seal substrates 12A and 12B respectively, and may be formed of silicone which has good release properties and thermal stability.

Cavity 60A may further include components which direct the flow of formulation 14 between substrates 12A, 12B and provide fluid containment features in proximity to outer edges of the respective substrates. Alternatively, fluid containment features may be included on substrates 12A, 12B as lip-like elements (not shown) formed about an outer perimeter of substrates 12A, 12B. The fluid containment features of substrates may fit together, e.g., in an abutting fashion, to substantially seal cavity 60A when the formulation 14 is cured therein. Cavity 60A may also be formed with features to facilitate fluid containment at peripheral edges of substrates 12A, 12B.

Figure 8:
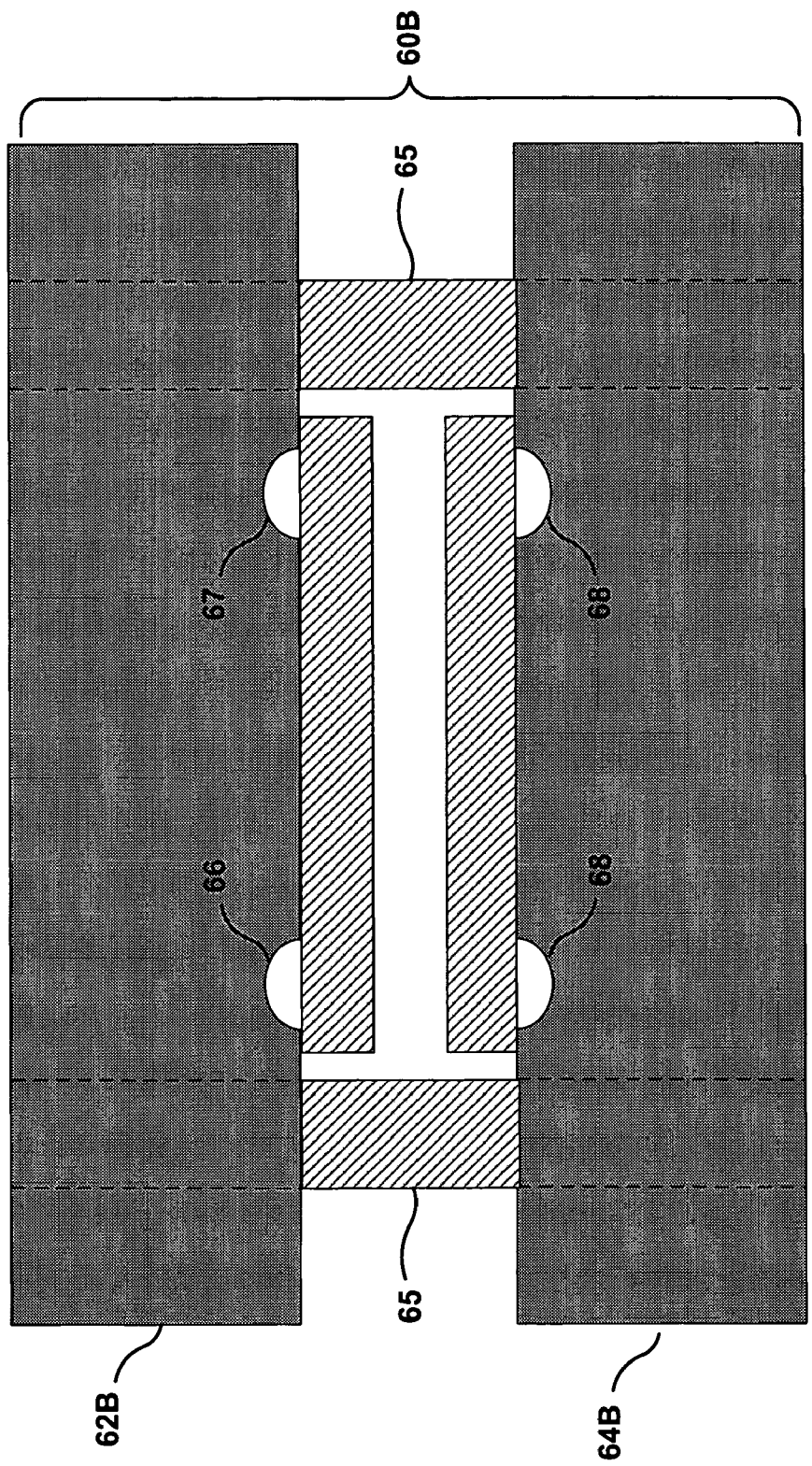
FIG. 8 is a cross-sectional side view of a cavity pre-aligned before the holographic media formulation is dispensed to hold two substrates within one optical fringe using an open loop method.
Figure 10:
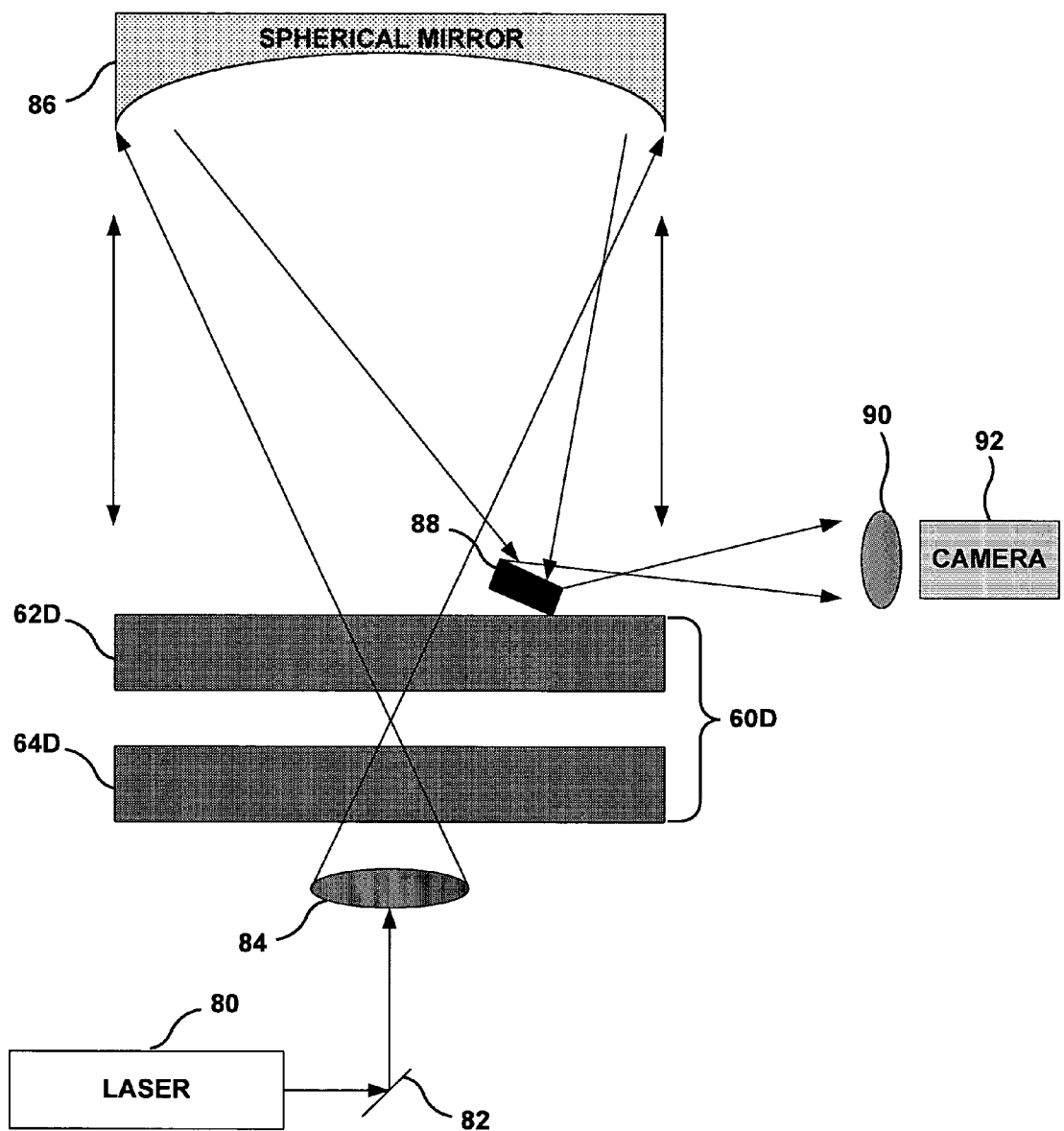
FIG. 10 is a cross-sectional side view of a cavity adjusted to hold two substrates within one optical fringe via optical interferometry.

FIG. 8 is a cross-sectional side view of cavity 60B pre-aligned to hold substrates 12A, 12B to within one optical fringe using an open loop method. Open loop methods do not require a feedback signal to correct deviations and are therefore very simple to implement. Prior to dispensing formulation 14, optical flats 62B and 64B are positioned to define upper and lower reference planes. A pre-calibration mechanical step is used to align cavity 60B. Pre-calibration may involve iterative evaluations of media samples produced from cavity 60. Cavity 60B may rest in a laser interferometer system to monitor interference fringes which facilitate alignment. FIG. 10 illustrates one such laser interferometer system in greater detail. Optical flats 62B and 64B may be optically transparent in order to monitor parallelism. Substrates 12A and 12B may be inserted using a robotic arm or other automated system for placement of substrates. In this embodiment, the system may apply a vacuum force via vacuum grooves 66, 67, 68, 69 to hold substrates 12A and 12B against optical flats 62B and 64B.

After pre-calibration is complete, cavity 60B is left without corrective adjustments for several cycles. Experience has shown that cavity 60B can maintain substrate parallelism to within one optical fringe for greater than 1,000 cycles of fabricated holographic media. Multi-chemistry holographic formulation 14 exhibits slight shrinkage after curing and stabilizing. This slight shrinkage of formulation 14 may allow medium 10 to be removed from the cavity without misaligning cavity 60B. Shrinkage is typically a few percent by volume, allowing medium 10 to be removed from cavity 60B without moving or making adjustments to the cavity. Medium 10 may be removed via a robotic arm or other automated system (not shown).

In another embodiment, guide rods 65 may permit a single degree of freedom for relative motions of optical flats 62B and 64B along the axis perpendicular to the holographic data storage medium 10 plane. Guide rods 65 may allow cavity 60B to vary the distance between optical flats 62B and 64B during the fabrication cycle. This can allow the ability to open cavity 60B a sufficient amount to facilitate ejection of a fabricated holographic data storage medium 10. Optical flats 62B and 64B may be optically transparent to monitor the repeatability of opening and closing of cavity 60B. The optical interferometry system illustrated in FIG. 10 may be used to monitor the quality of fabricated media.

Figure 9:
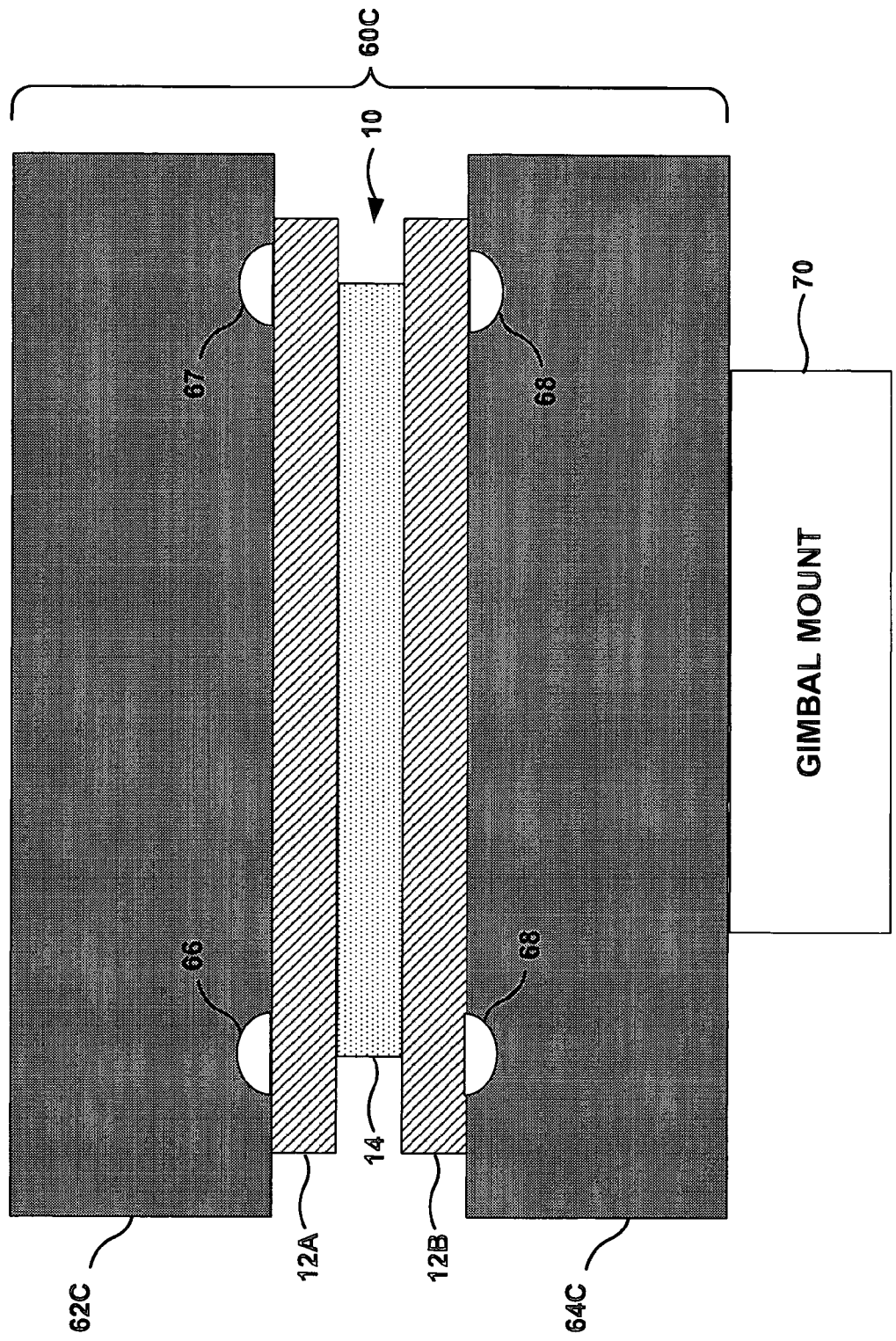
FIG. 9 is a cross-sectional side view of a cavity adjusted to hold two substrates within one optical fringe after the holographic media formulation has been dispensed.

FIG. 9 is a cross-sectional side view of cavity 60C adjusted to hold substrates 12A, 12B to within one optical fringe as multi-chemistry holographic media formulation 14 is dispensed. Position sensors (not pictured) monitor at least three points of cavity 60C for relative side-to-side positioning and provide parallelism feedback. In some embodiments, optical flat 64C may be gimbal mounted so that micrometer adjustments of the two orthogonal axis controls the parallelism of optical flats 62C and 64C. For example, lower gimbal mount 70 may be adjusted to minimize the number of fringes until optical flats 62C and 64C are parallel to within one optical fringe. Cavity 60 is held in position until multi-chemistry holographic formulation 14 is cured and holographic data storage medium 10 is stable.

Alternatively, position sensors (not pictured) may monitor parallelism of media samples ejected from cavity 60C. For example, at least three points of ejected media samples may be monitored for relative side-to-side positioning. Feedback from the position sensors may be used as a correction signal to make adjustments to the media currently held in cavity 60C as described above. In this closed-loop method, the parallelism control loop is not as "tight" because feedback correction signals are coming from media produced during previous cycles. Providing feedback correction signals based on measurements of media that are already created, however, may still be advantageous.

FIG. 10 is a cross-sectional side view of cavity 60D adjusted to hold substrates 12A, 12B to within one optical fringe via optical interferometry. Optical interferometry may be used to pre-align cavity 60D, such as in the open loop method illustrated in FIG. 8, or provide feedback for closed loops methods illustrated in FIG. 9, e.g., to provide control signals to gimbal mount 70. Optical flats 62D and 64D may be a mirror block similar to those used in conventional optical disk (CD and DVD) manufacturing, but comprises an optically transparent or translucent material. Laser 80 directs laser light by reflection off mirror 82 through optical flats 62D and 64D. Microscope lens 84 expands the laser light before it passes through the inner diameter apertures of optical flats 62D and 64D. Spherical mirror 86 recollimates the incident laser light with a diameter greater than that of holographic data storage medium 10.

In some embodiments, medium 10 has a diameter of 130 millimeters. Optical flat 64D reflects a portion of laser light back toward spherical mirror 86 where it is again refocused slightly off axis of the incident beam axis. Mirror 88 directs the slightly off light through lens 90 where the interference pattern is brought back to an image via camera 92. The interference pattern image may provide feedback to align optical flats 62D and 64D within one optical fringe. In further embodiments, the interference pattern may be used to monitor the mechanical repeatability of open loops methods illustrated in FIG. 8.

FIG. 11 is a cross-sectional side view of cavity 60E applying heat to holographic data storage medium 10 via heating elements 100 and 102 in order to accelerate the cure rate of multi-chemistry holographic media formulation 14. Optical flats 62E and 64E can be fabricated from opaque stainless steel parts similar to those used in conventional injection molding tools. Formulation 14 requires a thermosetting step to physically stabilize. Heating elements 100 and 102 radiatively or conductively heat medium 10 after multi-chemistry holographic formulation 14 is dispensed and substrates 12A and 12B are aligned within one optical fringe. In this manner, the cure rate of formulation 14 after formulation 14 is accelerated after formulation is dispensed between substrates 12A, 12B to quickly stabilize medium 10 and allow for quick cycle times. Prematurely removing medium 10 may cause distortion and negatively affect the performance of medium 10. By accelerating the cure rate in cavity 60E, these problems can be minimized or avoided.

FIG. 12 is a cross-sectional side view of microwave radiation source 110 applying microwaves 112 to holographic data storage medium 10 in order to accelerate the curing rate of multi-chemistry holographic media formulation 14. Formulation 14 may require a thermosetting step to physically stabilize. Microwave radiation 112 illuminates medium 10 after substrates 12A, 12B are aligned to within one optical fringe and formulation 14 is dispensed. Preferably, microwave 112 radiation heats formulation 14 without heating substrates 12A, 12B. Substrates 12A, 12B may have an anti-reflective coating on their respective outer surfaces to limit such heating of substrates 12A, 12B. The preferential absorption of microwaves in formulation 14 is attained by creating a stronger absorption coefficient in formulation 14 or by creating a concentrated intensity of microwave radiation in formulation 14. In either case, it is desirable to heat formulation 14 uniformly across the entire surface and through the thickness. Absorption of microwaves 112 in formulation 14 may be accomplished by illuminating entire medium 10 or passing medium 10 under a concentrated line source of microwaves 112.

The cavity design may be defined to create a high field intensity node centered in formulation 14 and may be affected by specific media geometries, e.g., the shape of the medium. The primary effect of illuminating medium 10 with microwave radiation is a greatly reduced cure time contributing towards fabrication cycle times of less than one minute without affecting light sensitivity of medium 10.

FIG. 13 is a cross-sectional side view of long wavelength radiation source 120 applying long wavelength optical radiation 122 to holographic data storage medium 10 in order to accelerate the curing rate of multi-chemistry holographic media formulation 14. Formulation 14 requires a thermosetting step to physically stabilize. Long wavelength radiation 112 illuminates medium 10 after substrates 12A, 12B are aligned to within one optical fringe and formulation 14 is dispensed. Preferably, long wavelength radiation 122 heats formulation 14 without heating substrates 12A, 12B. Substrates 12A, 12B may have an anti-reflective coating on their respective outer surfaces to limit heating of substrates 12A, 12B.

Obtaining fabrication cycles times of less than one minute may require accelerating the cure rate of formulation 14. Optical radiation source 120 illuminates formulation 14 with long wavelength optical radiation 122 to shorten the cure time of formulation 14. The photoinitiators in formulation 14 may be selected for holographic recording with 532 nanometer wavelength light. Incident photons generate free radicals and cause formulation 14 to stabilize. For thermal activation, optical radiation source 120 may be matched to a photoabsorbing dye in formulation 14 and have wavelength much longer than the write photoinitiator absorption range. In some embodiments, the photoinitiator absorption range may be 633 nanometers.

The photoabsorbing dye in formulation 14 absorbs the long wavelength, e.g., 1064 nanometer photons, to locally heat formulation 14. Further, the photoabsorbing dye may be optically matched to the surrounding photoinitiator, i.e., 532 nanometers, to prevent scattering of beams for recording or readout of holograms. It may be desirable to provide uniform cure acceleration through formulation 14 by uniformly dispersing the photoabsorbing dye throughout formulation 14. Additionally, long wavelength optical radiation may illuminate entire medium 10 or a concentrated line source may pass over medium 10.

In short, formulation 14 may include a photoinitiator sensitive to a first wavelength of light and a photoabsorbing dye sensitive to a second wavelength. The photoinitiator works with a write monomer to facilitate data storage in the formulation. However, the photoinitiator can be made insensitive to the second wavelength. In that case, the medium can be interrogated with the electromagnetic energy at the second wavelength to accelerate the cure of the formulation without substantially impacting the photoinitiator or the write monomer.

The concentration of photoabsorbing dye in the formulation should be sufficiently small to permit uniform exposure through formulation 14 thickness of medium 10 and large enough to convert available light sources into free radicals to heat formulation 14.

By way of example, a photoabsorbing dye concentration with absorption coefficient of 0.22/millimeter transmits approximately 80% of the incident light through an assumed 1 millimeter formulation 14 thickness of medium 10. This leaves approximately 20% of the incident absorbed in formulation 14. Another 20% of the light is absorbed in formulation 14 thickness of medium 10 on a second pass of the transmitted light after being reflected by a mirror. Therefore, the total light absorbed may be approximately 36% of the transmitted light.

For example, a typical holographic media may have a diameter of 130 millimeters with a 1 millimeter holographic recording layer and uses 15 grams of holographic media formulation. Assuming a heat capacity for the holographic media formulation of 1 Joule per gram degree Celsius, then a 50 degree Celsius temperature rise for the specified holographic recording layer in 10 seconds is calculated to be:

$$(1 \text{ J/g}^\circ \text{ C.}) \cdot (50^\circ \text{ C.}) \cdot (15 \text{ g}) / (10 \text{ s}) = 75 \text{ J/s} = 75 \text{ Watts}$$

of optical radiation absorbed. If the holographic media absorbs 36% of the incident power, this means that the required light source needs to supply 220 Watts with wavelength long enough so that the photoinitiator will not be reacted.

The primary effect of illuminating medium 10 with long wavelength optical radiation 122 is a greatly reduced cure time contributing toward fabrication cycle times of less than one minute, without affecting light sensitivity of medium 10.

FIG. 14 is a cross-sectional view of holographic data storage medium 10 having a perimeter seal to protect from environmental degradation. The perimeter of medium 10, i.e., inner 134 and outer diameter 136, is sealed from environmental degradation by ultraviolet radiation 132. Moisture in the atmosphere may react with multi-chemistry holographic formulation 14 and use storage capacity of medium 10. However, once optically cured, formulation 14 is relatively immune to water absorption. After medium 10 is properly aligned ultraviolet radiation source 130 illuminates perimeter 134, 136 of medium 10 with ultraviolet radiation 132, thereby sealing perimeter 134, 136 from environmental degradation. Substrates 12A, 12B sufficiently protect unexposed formulation 14 from environmental degradation.

However, a design trade-off exists between lost holographic recording volume and increased immunity to environmental degradation with increased optical cure depth. Immunity to environmental degradation increases with increased depth of cure of the perimeter. The cure depth may be controlled by choice of ultraviolet radiation wavelength and the absorption coefficient of formulation 14.

For example, formulation 14 may be exposed to green wavelength light, i.e., 532 nanometers, and then exposed to shorter wavelengths, i.e., 410 nanometers, which can be emitted from a laser diode during recording. At the recording wavelength, the absorption coefficient of formulation 14 may be adjusted to transmit 80% of incident radiation through the thickness of the holographic recording layer. This is necessary in order to maintain uniform recording grating quality throughout the holographic recording layer and enable efficient use of the storage capacity of medium 10. Optically curing the perimeter of medium 10 with wavelengths equal to the recording wavelengths may cure the perimeter too far into medium 10 and use excess storage capacity. Using wavelengths shorter than that which are used for recording, i.e., ultraviolet radiation, may be highly advantageous. For example, 400 nanometer wavelength radiation may be used to cure the perimeter to a depth equal to the typical substrate thickness of 1 millimeter.

Substrates 12A, 12B themselves, especially having a thermoplastic construction, act as optical attenuators for sufficiently short wavelengths. Therefore, medium 10 may be entirely illuminated and only exposed formulation 14 at the perimeter will be optically cured.

Figure 15:
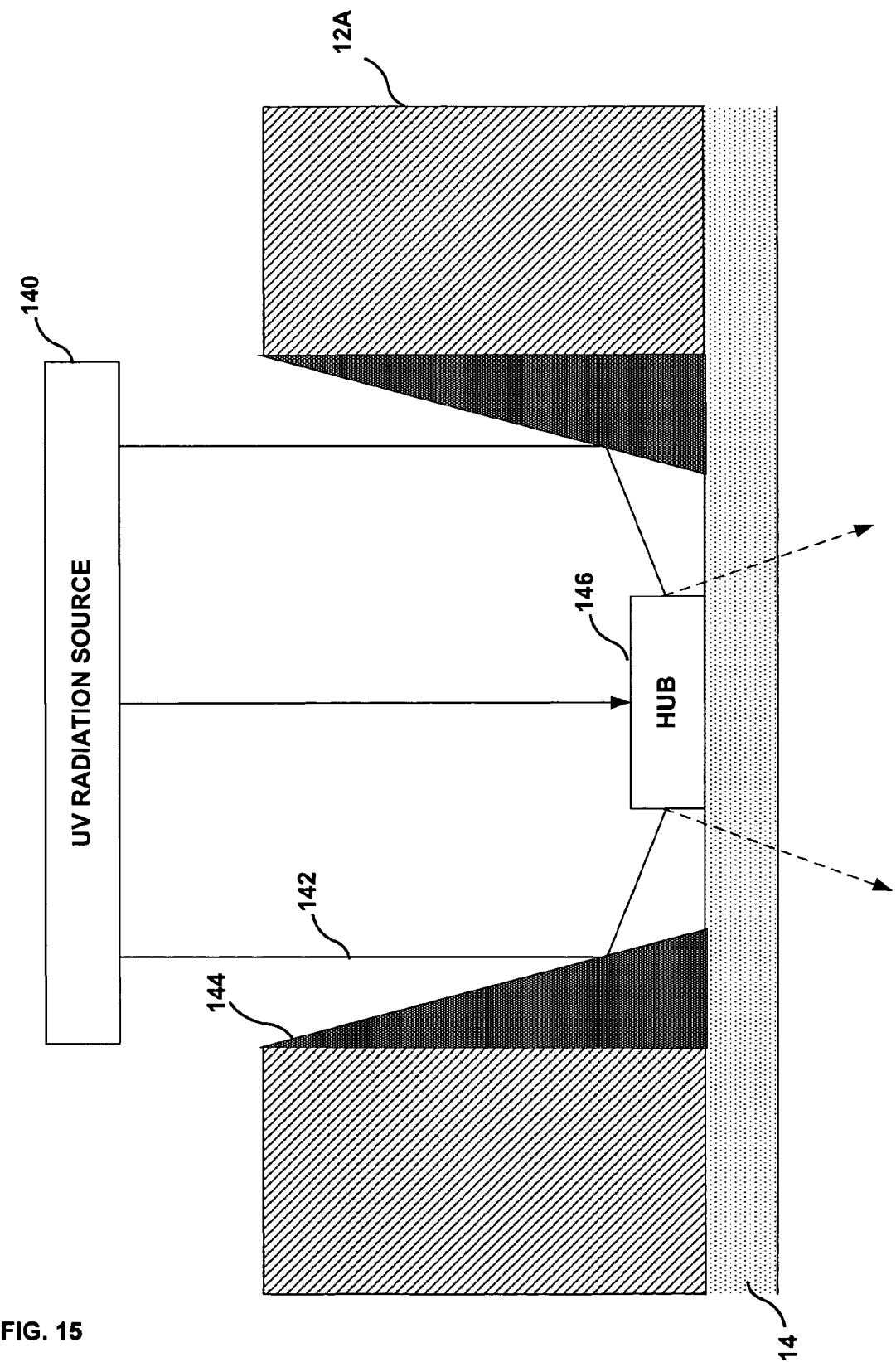
FIG. 15 is a cross-sectional view of a light shielding cone directing ultraviolet radiation onto edges of a holographic data storage medium.

FIG. 15 is a cross-sectional view of light shielding cone 144 directing ultraviolet radiation 142 onto inner edges of a holographic data storage medium. An ultraviolet curable adhesive may be used to secure hub 144 to the medium. Alternatively, hub 144 can be cured to the medium by curing formulation 14 around hub 144.

Multi-chemistry holographic formulation 14 is optically active and exposure to ultraviolet radiation may consume storage capacity of medium 10. Light shielding cone 144 directs ultraviolet radiation 142 through formulation 14 of medium 10 only in the interior region, thereby avoiding any unnecessary exposure to other regions of medium 10 where formulation 14 can be used for data storage.

The index of refraction for typical holographic formulation materials is approximately 1.52 and the critical angle of incidence is typically slightly larger than 41 degrees. Light shielding cone 142 may have a mirrored surface and be designed to be conical in shape such that incident ultraviolet radiation is directed at an angle less than 41 degrees incident to multi-chemistry formulation 14.

Light shielding cone 144 may also collect more ultraviolet radiation 142 from ultraviolet radiation source 140 further decreasing fabrication cycle times. Further, a beveled perimeter of hub 146 may prismatically redirect incident ultraviolet radiation. The bevel angle of the perimeter of hub 146 should also be less than 41 degrees to prevent ultraviolet radiation from being guided outward along the radius of medium 10.

Various embodiments of the invention have been described. The invention may be capable of providing advantages in holographic data storage media fabrication techniques. Holographic media typically have a sandwich construction in which a holographic media formulation is sandwiched between two substrates. The holographic media formulation may include two or more components which are mixed together prior to injection between the substrates. In particular, systems and methods described herein allow for fabrication of such media within reasonable cycle times, such as less than one minute, and adhere to stringent requirements for optical clarity and parallelism to ensure optimal performance of the media. Accordingly, the system and techniques can be used to improve the large scale manufacturability of such media. These and other embodiments are within the scope of the following claims.

The invention claimed is:

1. A method to fabricate a holographic data storage medium comprising:
    aligning a cavity such that an upper flat and a lower flat of the cavity are substantially parallel;
    mixing at least a first component and a second component to create a multi-chemistry holographic formulation using a mixer comprising a first stage including a first set of mixing elements that mixes, the first and second components and a second stage including a second set of mixing elements that further mixes the first and second components, wherein the mixing elements in the first stage are larger than the mixing elements in the second stage;
    dispensing the multi-chemistry holographic formulation between two substrates inside the cavity using a dispense nozzle, wherein the dispense nozzle receives the multi-chemistry holographic formulation from the mixer and dispenses the multi-chemistry holographic formulation through one of the flats and through a hole formed in one of the substrates to dispense the multi-chemistry holographic formation between the two substrate, wherein outer surfaces of the two substrates are held to a substantially parallel position inside the cavity by the substantially parallel upper and lower flats; and
    curing the multi-chemistry holographic formulation inside the cavity when the two substrates are held to the substantially parallel position to form holographic data storage medium.

2. The method of claim 1, wherein the mixer comprises a third stage including a third set of mixing elements, wherein the mixing elements in the second stage are larger than the mixing elements in the third stage.

3. The method of claim 2, wherein the mixer comprises a fourth stage including a fourth set of mixing elements, wherein the mixing elements in the third stage are larger than the mixing elements in the fourth stage.

4. The method of claim 2, wherein the first and second and third stages comprise static mixing elements.

5. The method of claim 1, wherein the dispense nozzle is coated with boron oxide.

6. The method of claim 1, wherein aligning cavity comprises aligning the flats of the cavity prior to the two substrates being placed into the cavity, wherein the two substrates are held such that parallelism of the medium is achieved to within one optical fringe when the multi-chemistry holographic formulation is dispensed between the two substrates forcing the two substrates against the pre-aligned flats of the cavity.

7. The method of claim 1, wherein aligning the cavity comprises dynamically controlling the cavity such that when the multi-chemistry holographic formulation is dispensed between the two substrates, the cavity is dynamically aligned to ensure parallelism of the medium to within one optical fringe.

8. The method of claim 1, wherein the multi-chemistry holographic formulation includes a photoiniatator, a monomer and a photosensitive dye, the method further comprising curing the multi-chemistry holographic formulation using radiation of a wavelength, wherein the photosensitive dye is substantially sensitive to the radiation at the wavelength and the photoiniatator and the monomer are substantially insensitive to the radiation at the wavelength.

9. The method of claim 1, further comprising sealing a perimeter of the holographic data storage medium by illuminating the perimeter of the medium with ultraviolet radiation to create an environmental barrier at the perimeter of the medium.

10. The method of claim 1, further comprising curing a hub onto a center hole of the medium, wherein the center hole of the medium corresponds to the hole formed in at least one of the substrates.

* * * * *